US007614572B2

(12) United States Patent
Yamaguchi et al.

(10) Patent No.: US 7,614,572 B2

(45) **Date of Patent: *Nov. 10, 2009**

(54) ELECTROSTATIC SPRAYING DEVICE

(75) Inventors: Naoki Yamaguchi, Hikone (JP); Shunichi Nagasawa, Nishinomiya (JP); David Edward Wilson, Reisterstown, MD (US); Masayuki Yamasaki, Higashiosaka (JP)

(73) Assignees: Panasonic Electric Works Co., Ltd., Osaka (JP); The Procter & Gamble Company, Cincinnati, OH (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/588,729

(22) PCT Filed: Nov. 26, 2004

(86) PCT No.: PCT/JP2004/017997

§ 371 (c)(1),
(2), (4) Date: Aug. 8, 2006

(87) PCT Pub. No.: WO2005/075094

PCT Pub. Date: Aug. 18, 2005

(65) Prior Publication Data

US 2007/0152086 A1 Jul. 5, 2007

(30) Foreign Application Priority Data

Feb. 9, 2004 (JP) ............................ 2004-001361

(51) Int. Cl.

| | |
|---|---|
| ***B05B 5/00*** | (2006.01) |
| *B05B 1/00* | (2006.01) |
| *B05B 9/04* | (2006.01) |
| *B65D 1/32* | (2006.01) |
| *A01G 25/14* | (2006.01) |

(52) U.S. Cl. ....................... 239/690; 239/704; 239/706; 239/708; 239/600; 239/320; 239/323; 239/327; 239/375

(58) Field of Classification Search ................. 239/690, 239/704, 706, 708, 600, 320, 323, 327, 375
See application file for complete search history.

(56) References Cited

U.S. PATENT DOCUMENTS 4,380,786 A * 4/1983 Kelly ......................... 361/228

(Continued)

FOREIGN PATENT DOCUMENTS

WO WO 00/35524 A2 6/2000

(Continued)

OTHER PUBLICATIONS

Japanese Office Action w/English language translation for Chinese Application No. 200480041496.1, mailed Dec. 14, 2007.

*Primary Examiner*—Len Tran
*Assistant Examiner*—Steven Cernoch
(74) *Attorney, Agent, or Firm*—Cheng Law Group, PLLC

(57) ABSTRACT

An electrostatic spraying device has a removable cartridge with a reservoir containing a volume of liquid compositions to be electrically sprayed. The reservoir is deformable according to inner pressure and configured to provide a removable cartridge. The device includes a dispensing unit for spraying the liquid composition. The dispensing unit includes a nozzle for dispensing the liquid composition and an emitter electrode which charges the liquid composition for electrostatically spraying the liquid composition out through the nozzle. A suction pump is integrated into the dispensing unit in an immediately upstream relation with the reservoir for feeding the liquid composition from the reservoir to the nozzle. Thus, the suction pump can be concentrated together with the emitter electrode and the nozzle into the dispensing unit on one end of the reservoir, enabling to realize the cartridge of a compact design.

2 Claims, 23 Drawing Sheets

U.S. PATENT DOCUMENTS

| | | | | |
|---|---|---|---|---|
| 5,221,050 | A * | 6/1993 | Jeffries et al. | 239/708 |
| 5,512,228 | A * | 4/1996 | Adams et al. | 264/152 |
| 6,126,407 | A * | 10/2000 | Guentert et al. | 417/244 |
| 6,311,903 | B1 * | 11/2001 | Gaw et al. | 239/690 |
| 6,318,647 | B1 * | 11/2001 | Gaw et al. | 239/690 |
| 6,595,208 | B1 * | 7/2003 | Coffee et al. | 128/203.12 |
| 6,682,004 | B2 * | 1/2004 | Kadlubowski et al. | 239/690 |
| 2003/0002995 | A1 * | 1/2003 | Urano et al. | 417/322 |
| 2007/0114305 | A1 * | 5/2007 | Yamaguchi et al. | 239/690 |

FOREIGN PATENT DOCUMENTS

| | | | |
|---|---|---|---|
| WO | WO-02055211 | A1 | 7/2002 |
| WO | WO 03/072263 | A1 | 9/2003 |

* cited by examiner

FIG. 21
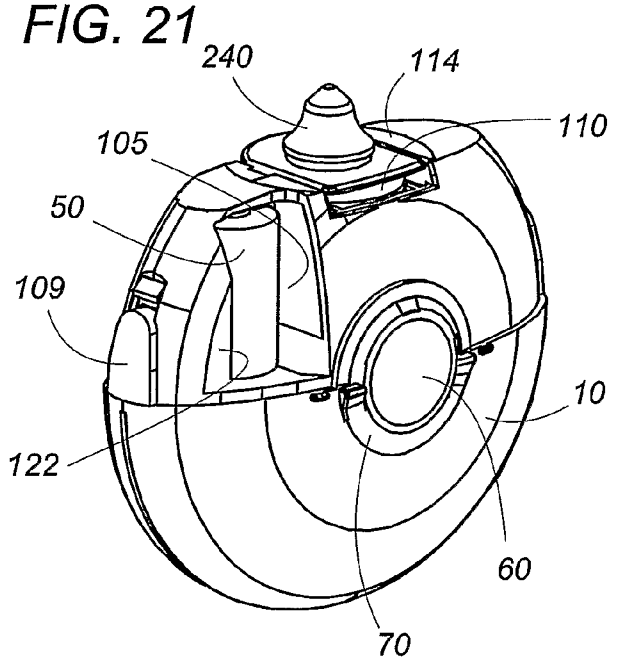
FIG. 22
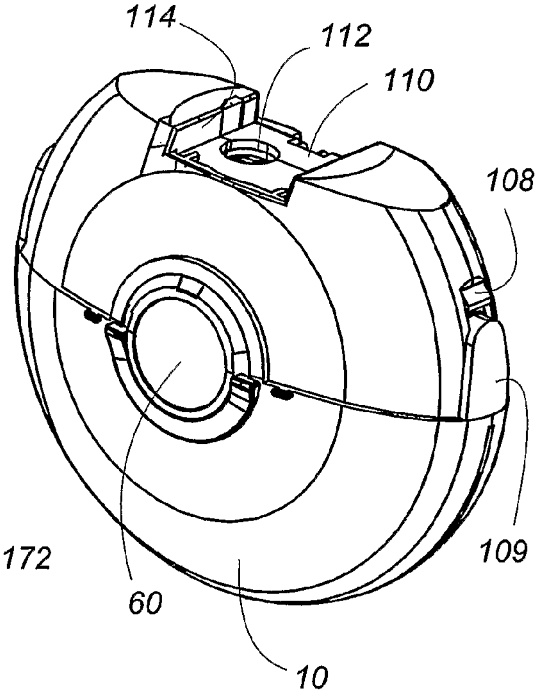
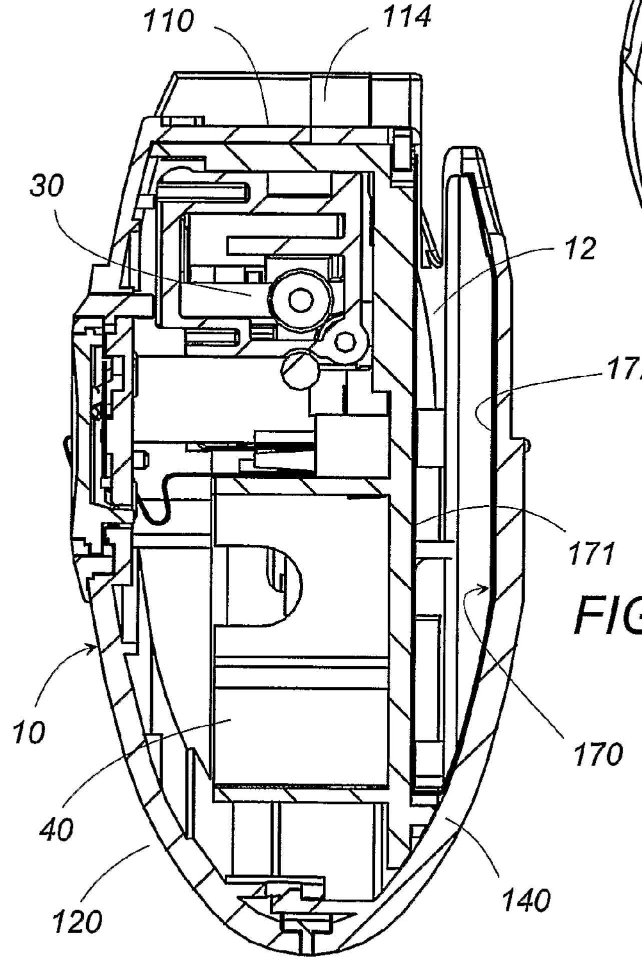
FIG. 23

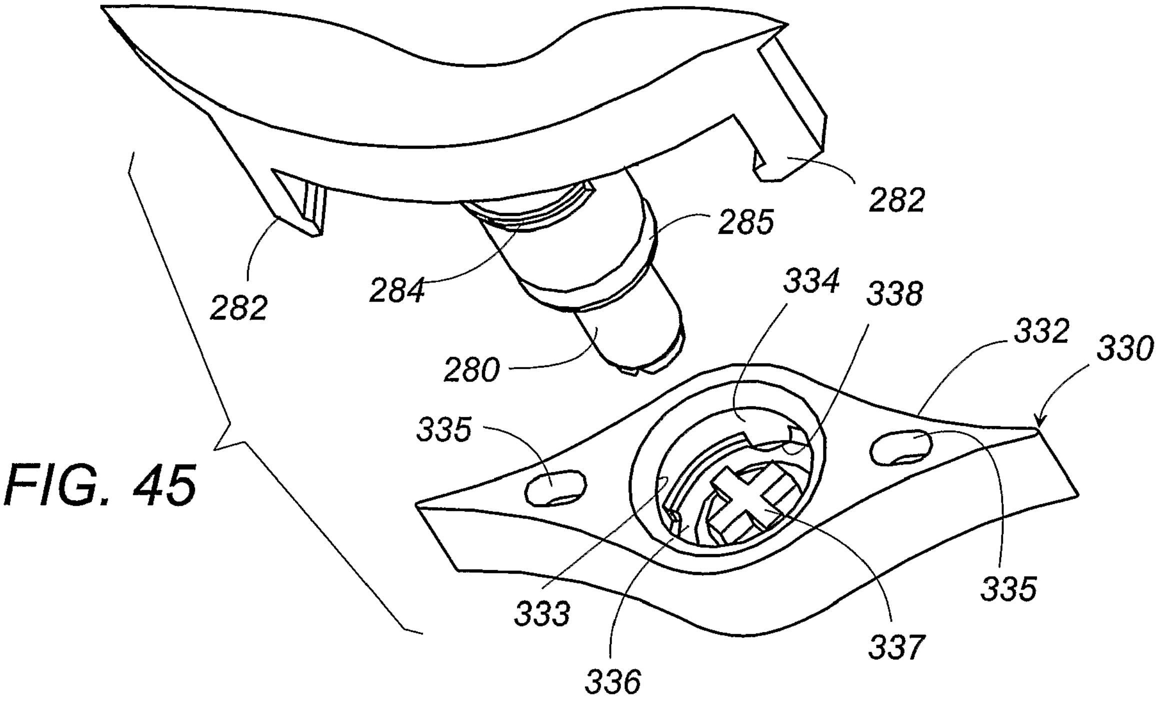
FIG. 45
FIG. 46
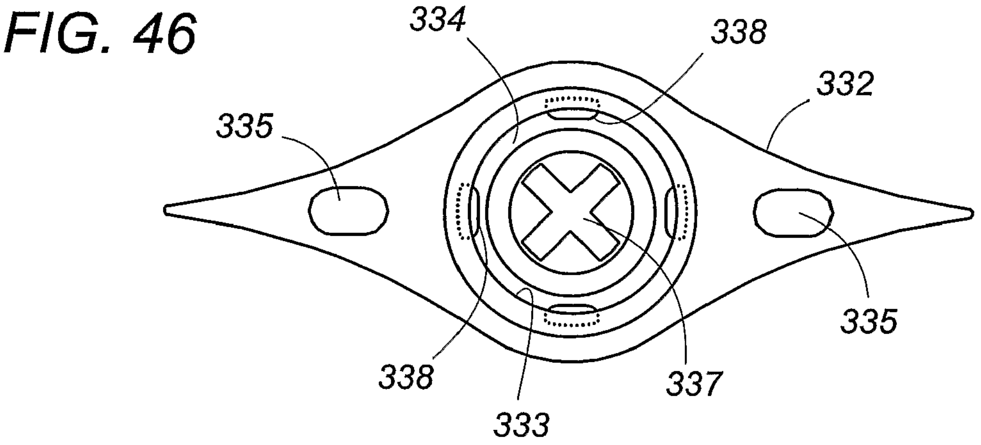
FIG. 47
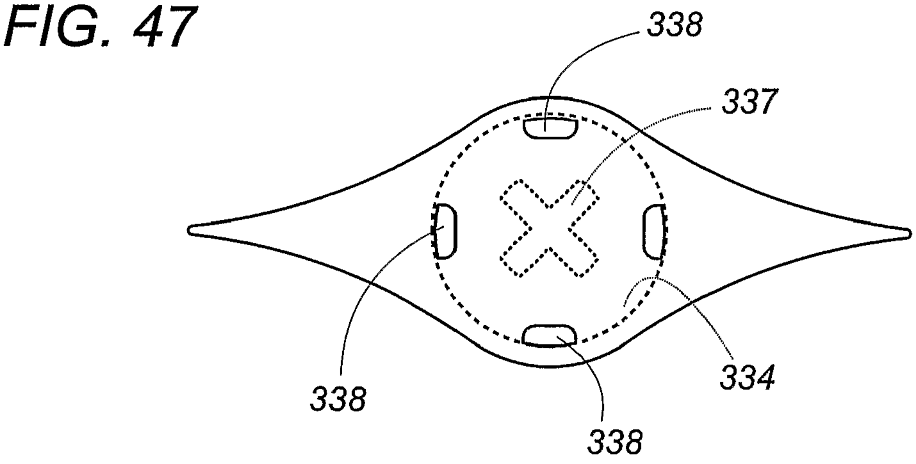

ELECTROSTATIC SPRAYING DEVICE

TECHNICAL FIELD

The present invention relates to an electrostatic device for personal use, and more particularly to a device for spraying a liquid composition by means of an electrostatic force.

BACKGROUND OF THE INVENTION

WO 03/072263 discloses an electrostatic spraying device having a removable cartridge with a reservoir containing a volume of a liquid composition. The device includes a plunger pump that displaces the liquid out of the reservoir and a nozzle for dispensing the liquid. The nozzle is provided with an emitter electrode which applies a high voltage to the composition being supplied from the reservoir to the nozzle, i.e., electrostatically charge the particles of the liquid composition for spraying the composition by the electrostatic force. The plunger pump disclosed in WO 03/077263 is provided at the rear end of the reservoir on opposite of the nozzle head, which adds an extra dimension to the overall volume of the removable cartridge, and therefore requires a corresponding larger space for the device to accommodate the cartridge. Consequently, when the cartridge is desired to be sufficiently compact to be easily carried with a person, the cartridge is realized only at an expense of reducing a liquid holding capacity of the reservoir. Thus, there remains a need for making the cartridge as compact as possible, while enabling the cartridge or reservoir to hold a sufficient amount of the liquid composition.

None of the existing art provides all of the advantages and benefits of the present invention.

SUMMARY OF THE INVENTION

The present invention is directed to an improved electrostatic spraying device which is capable of giving an increased liquid containing volume to a removable cartridge, yet keeping the cartridge as compact as possible for enhanced handling performance. The device in accordance with the present invention is configured to electrostatically charge and dispense the liquid composition from a supply to a point of dispense, and includes an actuator, a high voltage generator to provide a high voltage, a power source to activate the actuator and the high voltage generator, a reservoir to contain the supply of the liquid composition, and a dispensing unit. The dispensing unit is provided to spray the liquid composition, and includes a suction pump which is located in immediate upstream relation with the reservoir for supplying the liquid composition from the reservoir, and which is mechanically connected to the actuator to be driven thereby. An emitter electrode is included in the dispensing unit to be electrically connected to the high voltage generator in order to electrostatically charge the liquid composition. Also included in the dispensing unit is a nozzle that is disposed at the point of dispense for spraying the liquid composition.

One characterizing feature of the present invention resides in that the dispensing unit includes a suction pump which is located in an immediate upstream relation with the reservoir for supplying the liquid composition from the reservoir. The pump is mechanically connected to an actuator provided on the side of the device and is caused to operate thereby upon receiving the electric supply. Thus, the suction pump can be concentrated together with the emitter electrode, enabling a compact design. The reservoir is made deformable according to pressure and/or contents for efficient feeding of the liquid composition by the suction pump.

The pump may be in the form of a gear pump having a pair of gears one of which is formed with a joint for detachable driving connection with the actuator. The gear pump is of an inherently simple structure and contributes to making the pump itself compact. In this connection, the gear pump is incorporated as a pump unit which is shaped into a generally flat configuration. The gears are arranged within the thickness of the pump unit with respective rotation axes perpendicular to a plane of the pump unit. Formed in the pump unit is a horizontal channel extending within the thickness of the pump unit to define an inflow path of the liquid composition from the reservoir to the gear pump as well as an outflow path from the gear pump to the nozzle. Thus, the pump unit adds only a small thickness to the dispensing unit, contributing to making the whole cartridge compact.

The dispensing unit may additionally include a plug to be inserted into a fitment secured at the mouth of the reservoir, so that the reservoir and dispensing unit come into fluid communication. Various configurations of the plug and fitment are possible for providing a detachable or non-detachable connection between the dispensing unit and the reservoir. The reservoir may be shaped to have a planar configuration of an approximate segment of circle defined between a chord and a circumference of an approximate circle which is greater than a circumference of a semicircle, and a mouth provided at the center of the chord. This way, the mouth is located at a position so that the distance from the mouth to any point of the circumference of the circle is approximately the same. Thus, the liquid composition can be smoothly sucked up by the pump, thereby minimizing an amount of unconsumed liquid composition.

The fitment may be provided with a valve which seals the reservoir in a non-use condition for protecting the liquid composition from leakage or deterioration by exposure to the atmosphere. For this purpose, the fitment is configured to be cooperative with the valve to establish a feed passage from the reservoir to the plug of the dispensing unit for feeding the liquid composition from within the reservoir to the dispensing unit. The valve is configured to open and close the feed passage depending upon the condition of the use of the reservoir.

The fitment is preferred to move relative to the plug between an interim position where the valve is kept closed and a ready-to-use position where the valve is actuated by the plug to open. The fitment is retained to the dispensing unit even at the interim position such that the reservoir can be presented as being integrated with the dispensing unit. With this consequence, the user is only required to move the fitment into the ready-to-use position when using the fresh liquid composition, without being bothered to attach the reservoir to the dispensing unit. To this end, the fitment is configured to have a first catch which comes into a latching engagement with the dispensing unit in the interim position, and a second catch which comes into a latching engagement with the dispensing unit in the ready-to-use position. Further, when the device is out of use for a relatively long period, the user can move the fitment back into the interim position for protecting the liquid composition during the non-use period.

These and still other features, aspects, and advantages of the present invention will become more apparent from the following detailed explanation of the preferred embodiment when taken in conjunction with the attached drawings.

BRIEF DESCRIPTION OF THE DRAWINGS

While the specification concludes with claims particularly pointing out and distinctly claiming the invention, it is believed that the present invention will be better understood from the following description of preferred, nonlimiting embodiments and representations taken in conjunction with the accompanying drawings in which:

FIG. 21 is a perspective view of the above device with the inner cover removed;

FIG. 22 is a perspective view of the above device shown with the cartridge and an inner cover removed;

FIG. 23 is a vertical section of the device corresponding to FIG. 22;

FIG. 45 is an exploded perspective view illustrating the check valve in association with a plug of the dispensing unit;

FIG. 46 is a top view of the check valve;

FIG. 47 is a bottom view of the check valve;

DETAIL DESCRIPTION OF THE INVENTION

Figure 1:
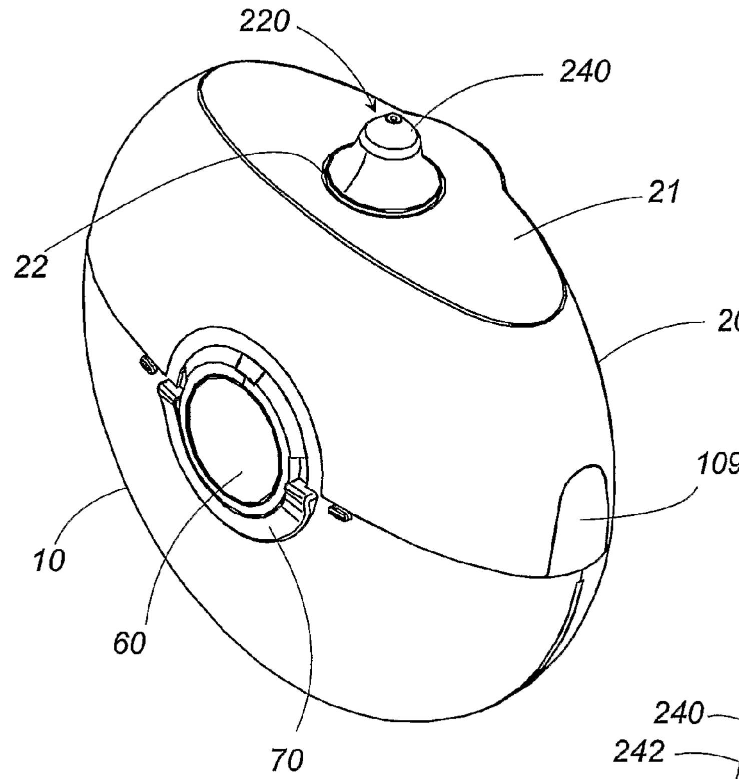
FIG. 1 is a perspective view of an electrostatic spraying device in accordance with a preferred embodiment of the present invention.

Now referring to FIGS. 1 to 7, there is shown an electrostatic spraying device in accordance with a preferred embodiment of the present invention. The device is configured into a self-contained portable structure that is compact enough to be easily carried with. The device is basically composed of a main body housing 10 and a removable cartridge 200 containing a volume of a liquid composition to be electrostatically sprayed according to a mechanism already disclosed in WO 01/12336, WO 01/12335, US 2001-0020653A, US 2001-0038047A, US 2001-0020652A, US 2001-0023902A, and WO 03/072263, incorporated herein by reference. The liquid composition utilized in the device include those disclosed in WO 03/072263, also incorporated herein by reference, i.e., an emulsion having conductive and insulating phases, although not limited thereto.

The housing 10 is dimensioned to be grasped by a user's hand and incorporates an electric motor 30, a high voltage generator 40, and a battery 50, i.e., a power source for activating the motor and the high voltage generator 40. The motor

30 actuates a dispensing unit 220 provided on the side of the cartridge 200 to dispense the liquid composition, while the high voltage generator 40 applies a high voltage of 1000 volts or more to the liquid composition being dispensed for electrically spraying the liquid composition. The housing 10 is formed with a concavity 12 for receiving a reservoir 210 of the cartridge 200 containing the liquid composition. In a preferred embodiment, an inner cover 20 is detachably fitted over the upper end of the housing 10 to hold therebetween the dispensing unit 220 of the cartridge 200. In another preferred embodiment, an outer cover 26 is detachably fitted over the inner cover 20 to conceal therebehind the dispensing unit 220 for protection thereof when the device is not in use.

In one preferred embodiment, the cartridge 200 is composed of the reservoir 210 and the dispensing unit 220. In another preferred embodiment not shown herein, the cartridge is made only of the reservoir.

The reservoir 210 may be suitably made of a plastic material which is deformable according to the contents of the liquid composition. The reservoir 210 may be made by the same resilient material, or combination of a rigid material and resilient material. An example of commercially available material suitable for providing the reservoir is the laminated film of VM-PET (Vacuum Metalised Polyethylene Terephthalate) having a thickness of 12 microns and LLDPE (Linear Low Density Polyethylene) having a thickness of 60 microns. Commercially available films are GLAE by Toppan for VM-PET, and FCS by Tocello for LLDPE. The reservoir may also be made of conductive material and being electrically connected to the high voltage generator so that the liquid composition therein is provided with more or less a common electric potential.

Figure 2:
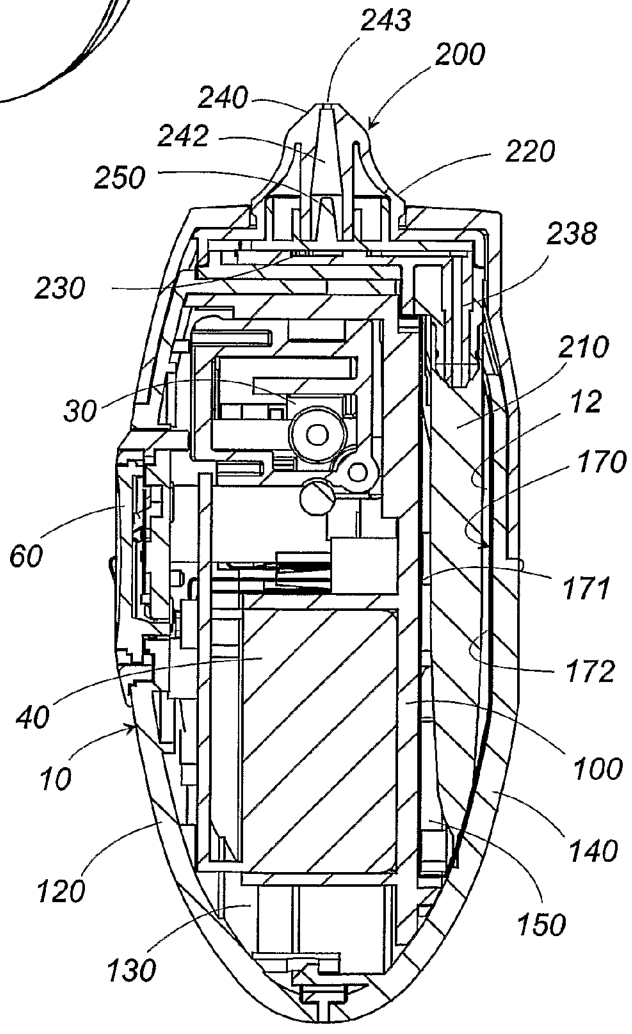
FIG. 2 is a vertical section of the device of FIG. 1.
Figure 3:
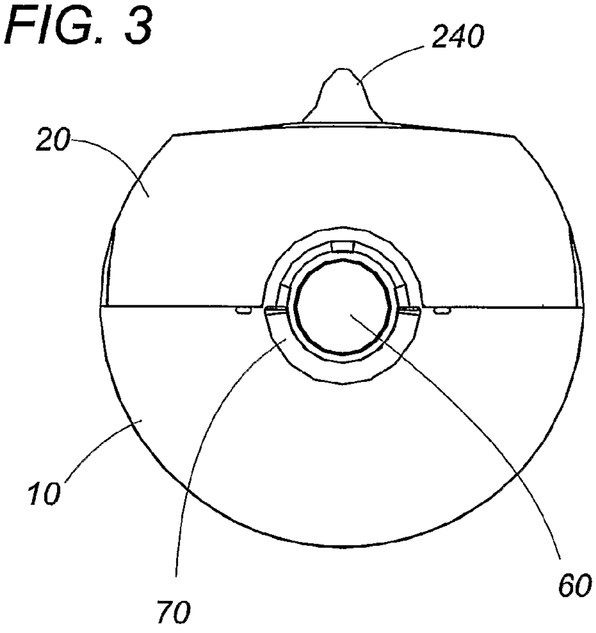
FIG. 3 is a front view of the device of FIG. 1.
Figure 4:
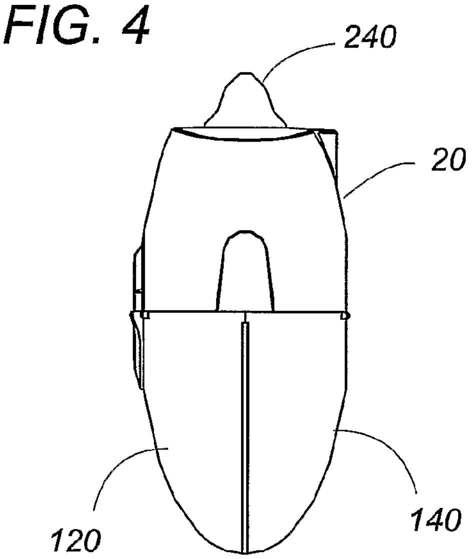
FIG. 4 is a side view of the above device.

As best shown in FIGS. 6 to 9, in a preferred embodiment the dispensing unit 220 includes a pump 230 and a nozzle 240 which are integrated into a single structure. The pump 230 is a gear pump having a flat base 231 molded from a plastic material and formed with a plug 232 for detachable insertion into a fitment 212 secured to a mouth of the reservoir 210. The pump 230 includes a metal plate 270 mounted in the base 231 of the molded plastic. The metal plate 270 is formed in its upper surface with a pump chamber receiving a pair of intermeshing gears 234, an inflow channel 236 extending from within the plug 232 to the chamber, and an outflow channel 237 extending from the chamber to the nozzle 240. The pump chamber as well as the channels 236 and 237 are sealed by an emitter electrode 250 secured between the base 231 and the nozzle 240. The gears 234 are arranged to have their individual rotation axes extending perpendicular to the plane of the base 231, realizing a flat pump structure sufficient to be capable of being disposed between the reservoir 210 and the nozzle 240 only at a minimum extra dimension with respect to the height or length of the dispensing unit 220. One of the gears 234 is coupled to a joint 238 projecting on the lower face of the base 231 for detachable driving connection with the motor 30 disposed within the housing 10. As the gears are driven to rotate, the liquid composition is sucked up from the reservoir 210 through the inflow channel 236 and expelled through the outflow channel 237 to the nozzle 240. Preferably, the nozzle 240 is molded from a compatible plastic material as the base 231 to have an internal nozzle pathway 242 extending from the bottom center to an apex 243, as best shown in FIG. 2.

The emitter electrode 250 is disposed between the base 231 of the pump 230 and the bottom 241 of the nozzle 240 in order to apply the high voltage to and charge the liquid composition being dispensed through the nozzle 240. In a preferred embodiment, the emitter electrode 250, which is connected to receive the high voltage from the high voltage generator 40 in the housing 10, includes a center antenna 251 and a coaxial cylinder 252. The center antenna 251 extends into the nozzle pathway 242 to charge the liquid composition being dispensed in cooperation with the cylinder 252 that is provided to surround the nozzle pathway 242 to avoid the undesired corona discharging for suitable electrostatic spraying. The top end of the center antenna 251 is receded from the apex 243 of the nozzle 240 to give a sufficient insulation distance therebetween.

Figure 11:
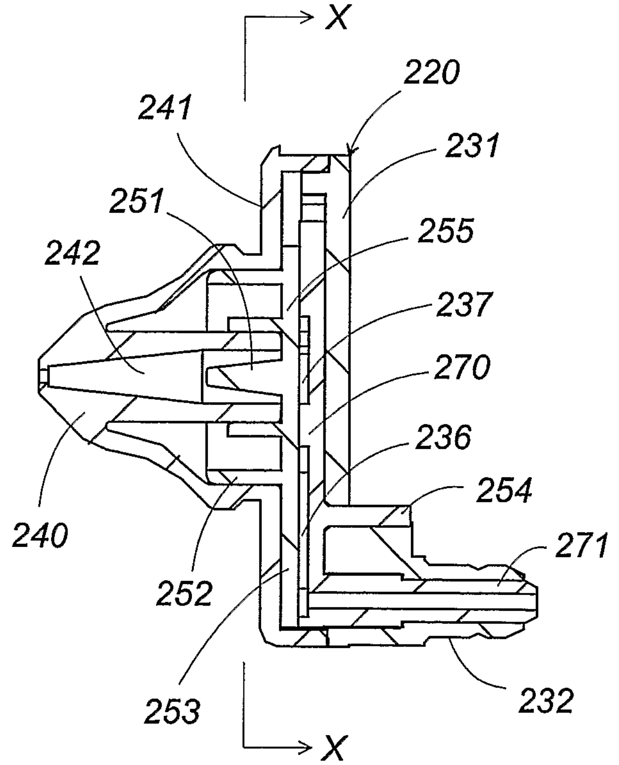
FIG. 11 is a sectional view of the dispensing unit.
Figure 12:
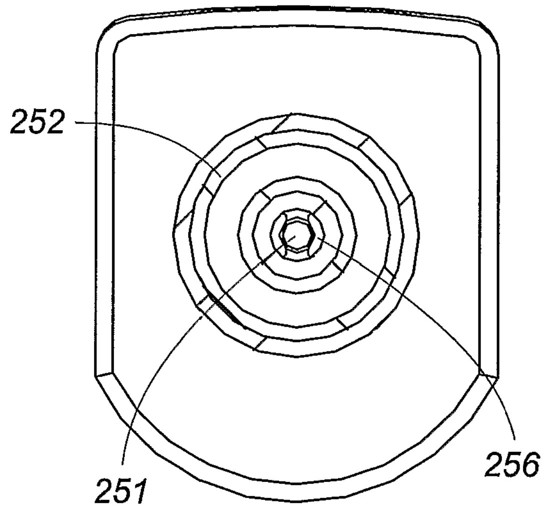
FIG. 12 is a section take along line X-X of FIG. 11.
Figure 13:
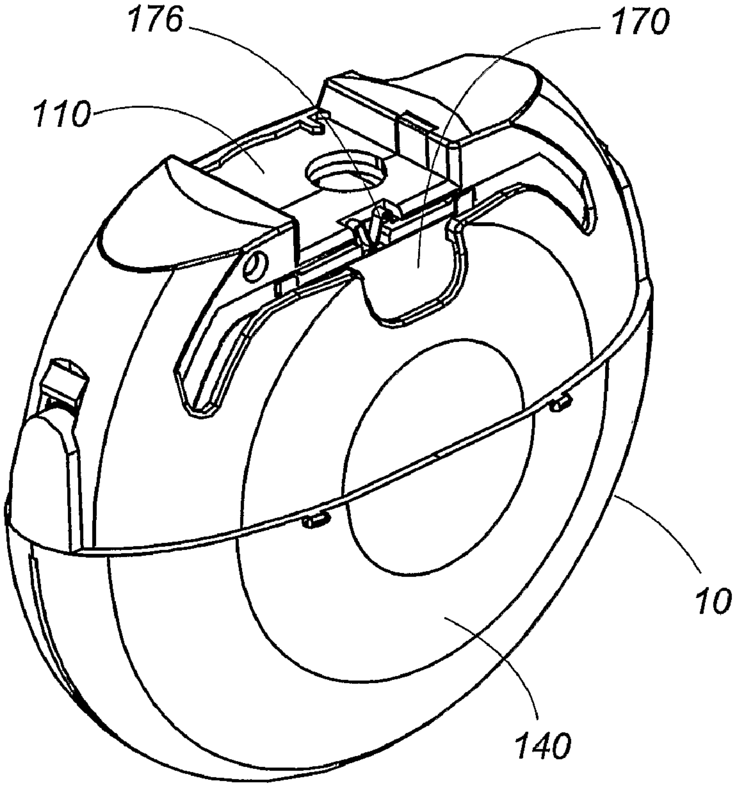
FIG. 13 is a perspective view of a main body housing of the device.
Figure 14:
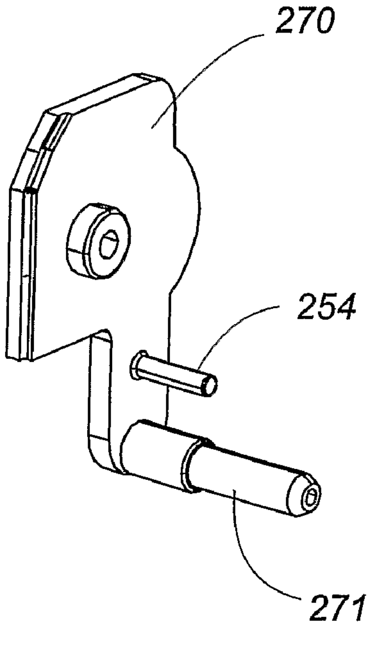
FIG. 14 is a perspective view of a metal plate forming a part of the dispensing unit.
Figure 15:
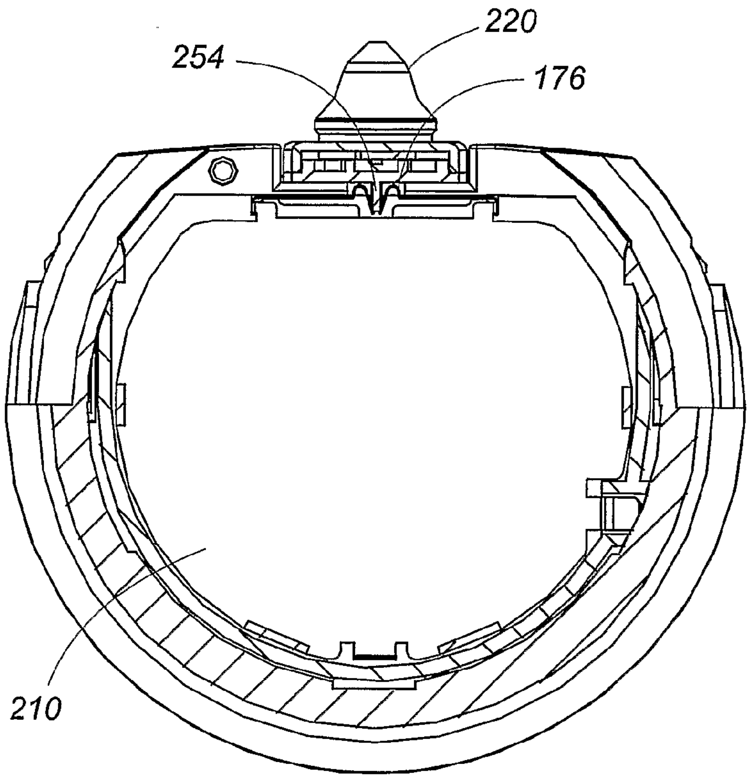
FIG. 15 is a partial rear section showing an electrical connection between the dispensing unit and a voltage terminal provided on the side of the housing.
Figure 16:
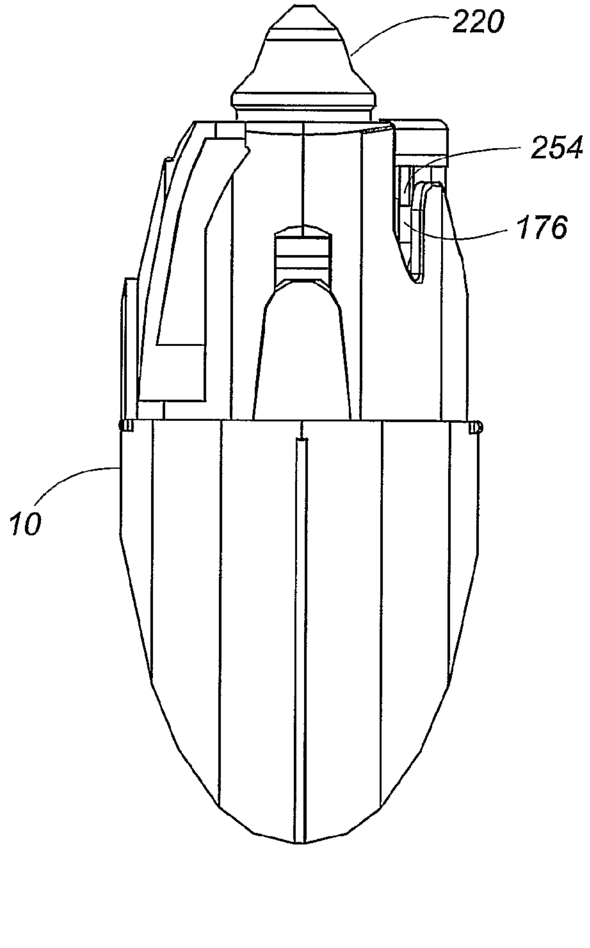
FIG. 16 is a partial vertical section showing the electrical connection between the dispensing unit and the voltage terminal.

As best shown in FIGS. 13 to 16, the metal plate 270 is formed integrally with a pin 254 which projects through the base 231 for detachable electrical connection with a voltage terminal 176 provided on the side of the housing 10 to relay the high voltage to the emitter electrode 250. Turning back to FIGS. 6 and 7, the emitter electrode 250 also includes a flat bottom 253 that is placed over the base 231 to seal the pump. The flat bottom 253 and the metal plate 270 are cooperative to charge the liquid composition within the pump in order to avoid undesired current flow within the liquid composition in the pump which would otherwise cause deterioration of the liquid composition. As shown in FIGS. 11 and 12, the cylinder 252 is connected to the antenna 251 by a rim 255. The rim 255 is formed with a plurality of slots 256 that communicate with the outflow channel 237 of the pump for passing the liquid composition from the pump to the nozzle pathway 242.

Figure 5:
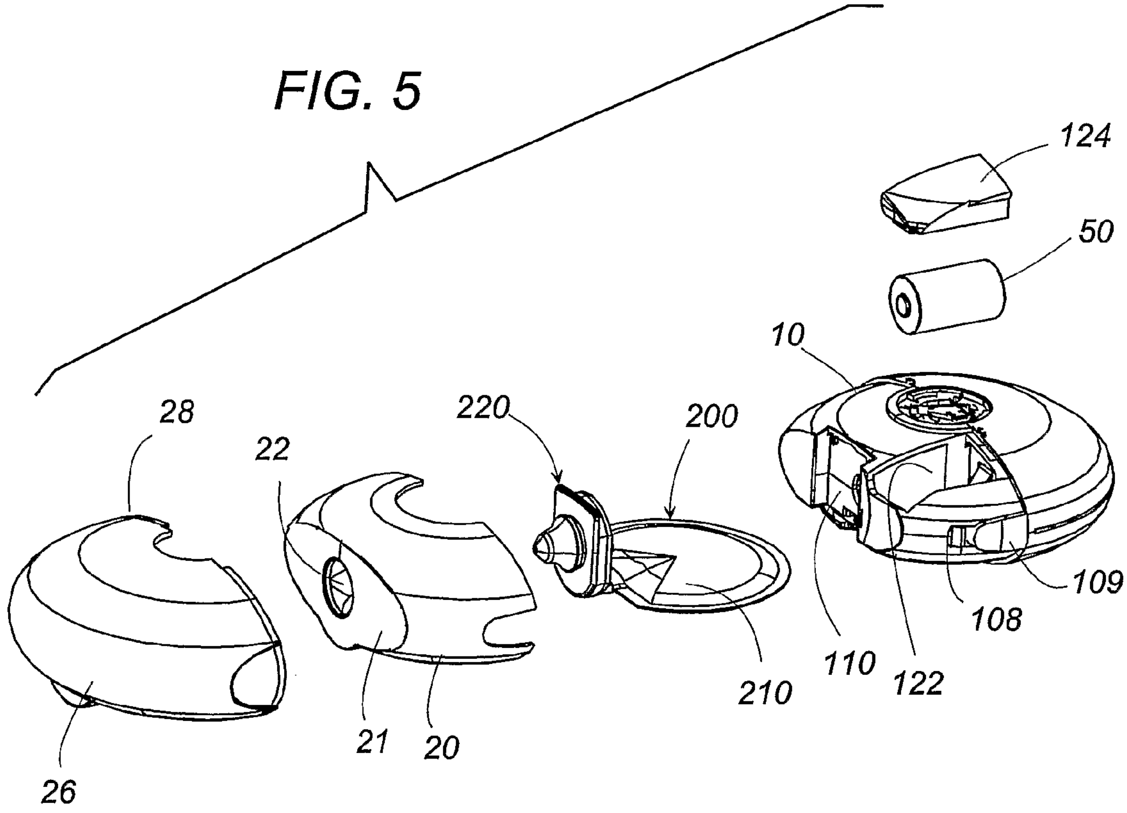
FIG. 5 is an exploded perspective view of the above device.
Figure 6:
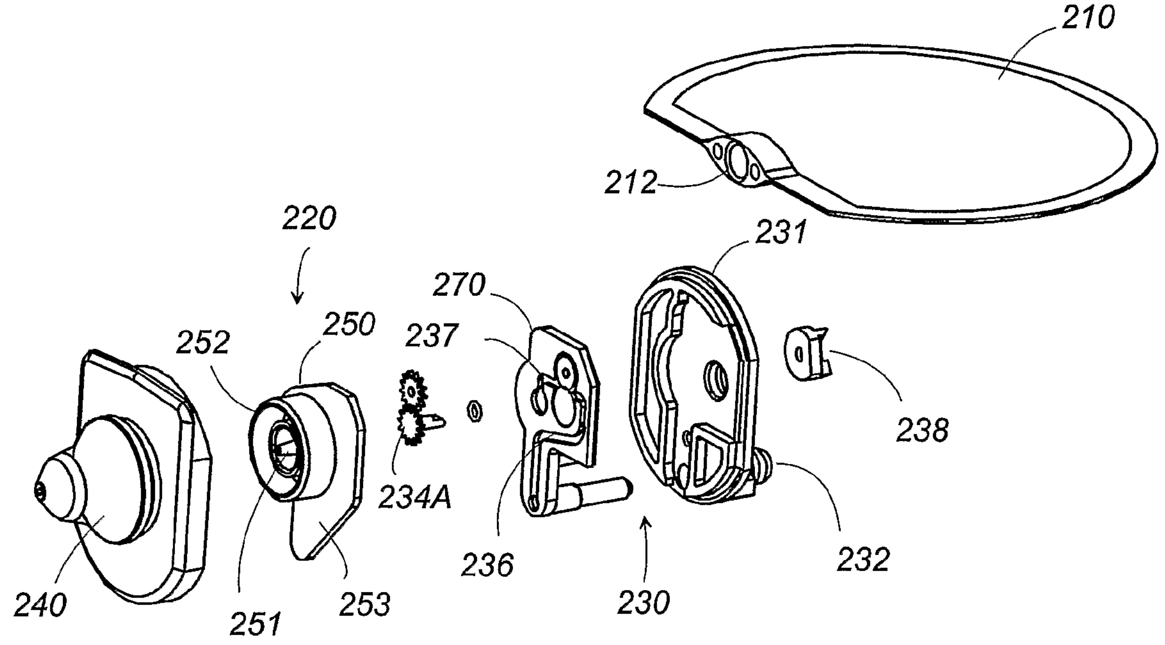
FIGS. 6 to 8 are respectively exploded perspective views of a removable cartridge utilized in the above device.
Figure 7:
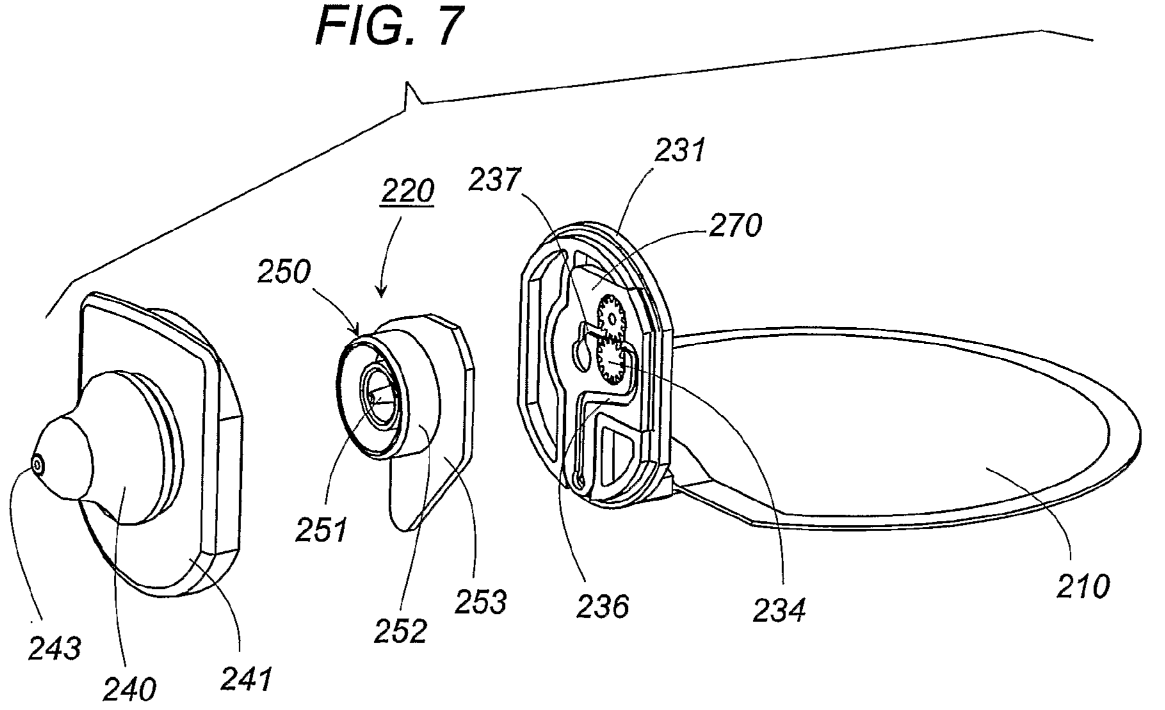
Figure 8:
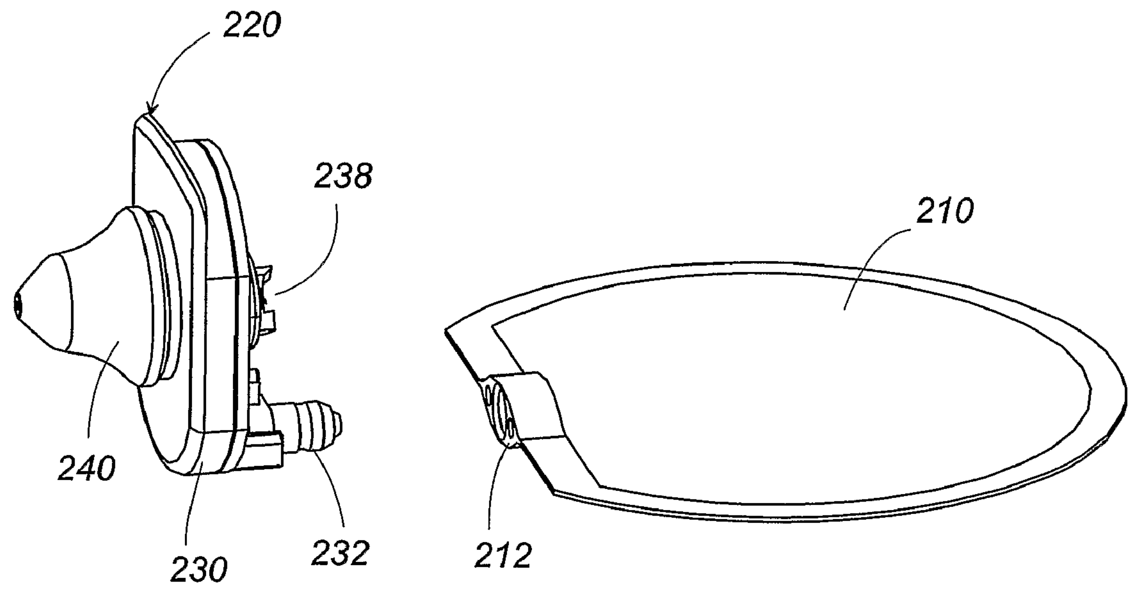
Figure 9:
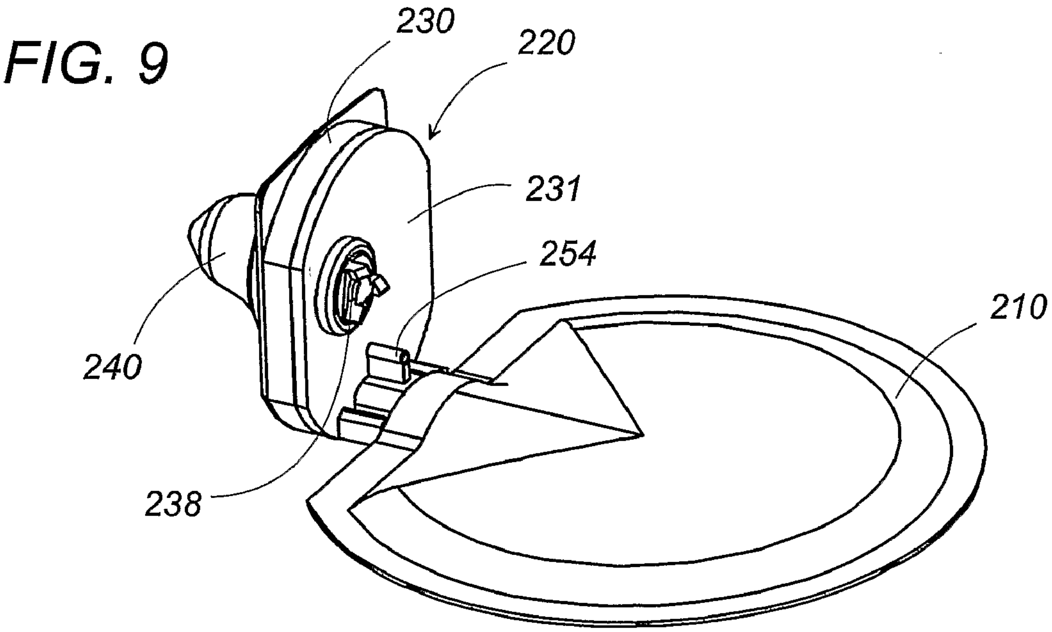
FIG. 9 is a perspective view of the cartridge of FIG. 8 as viewed from the bottom.
Figure 10:
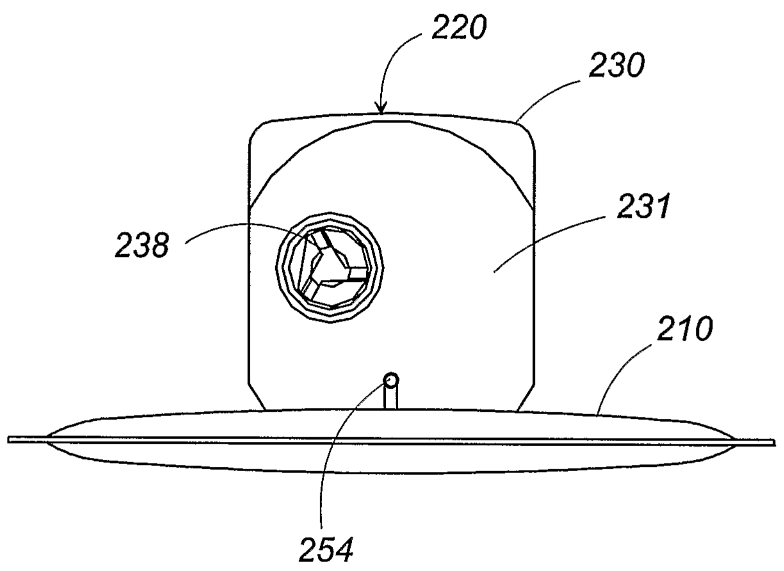
FIG. 10 is a bottom view of the cartridge of FIG. 9.
Figure 17:
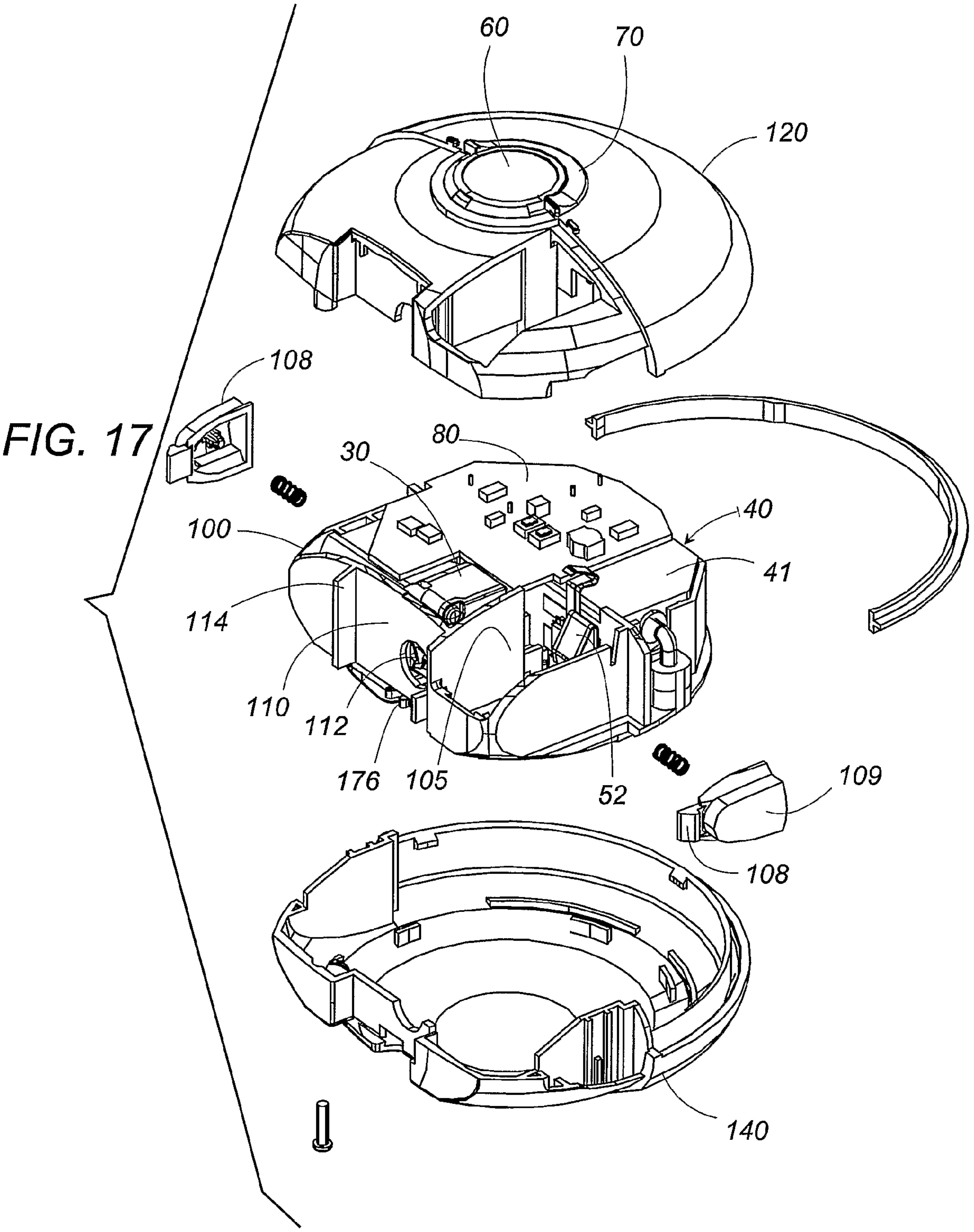
FIG. 17 is an exploded perspective view of the housing of the device.
Figure 18:
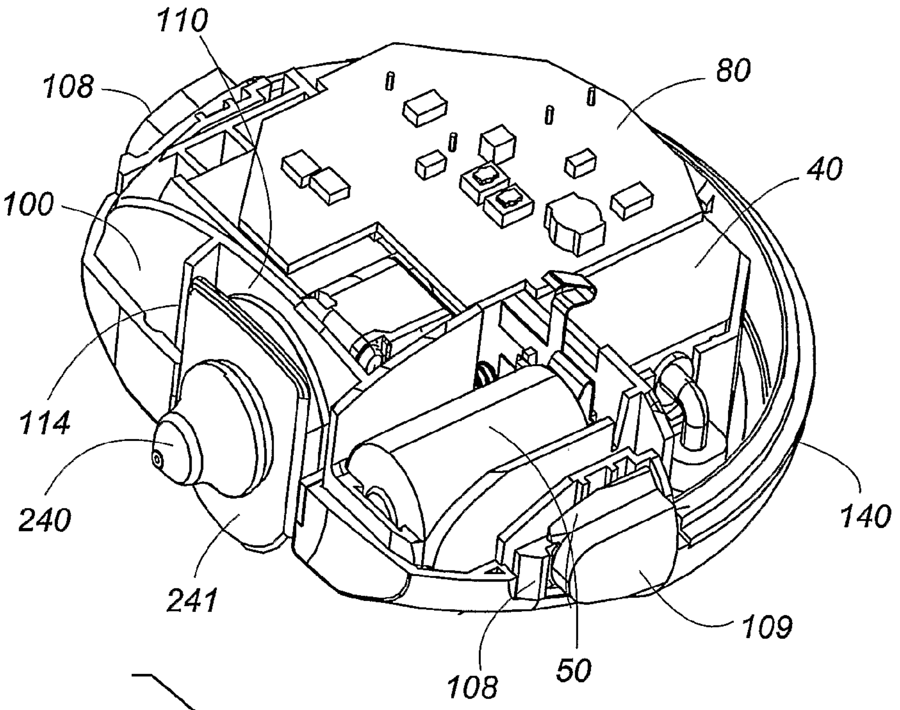
FIG. 18 is a perspective view of the device shown with a front shell of the housing removed.
Figure 19:
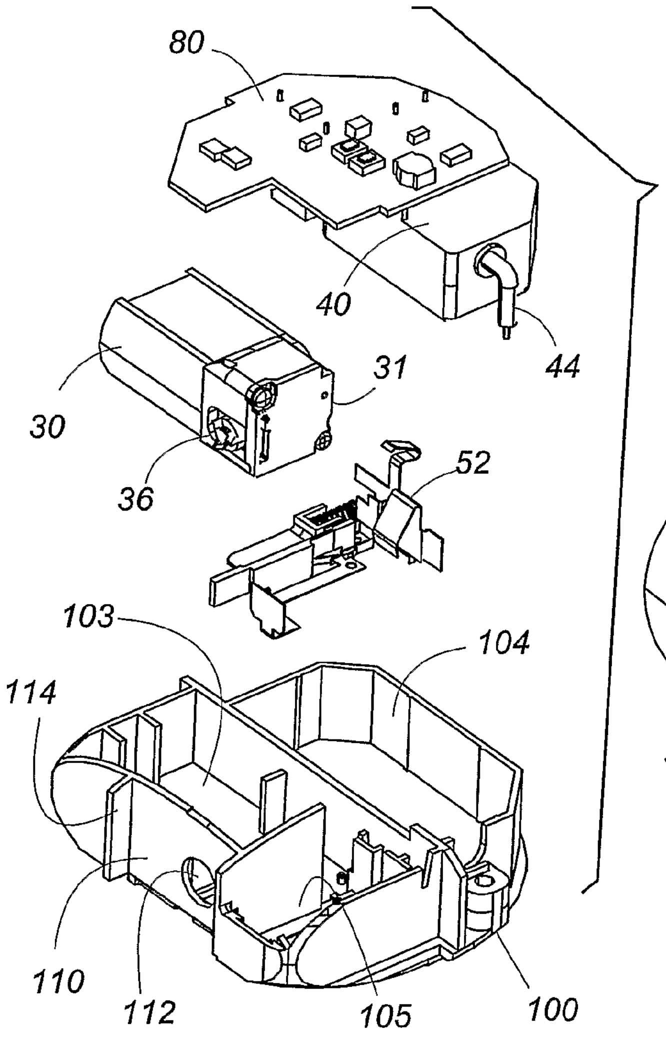
FIG. 19 is an exploded perspective view illustrating a center frame of the housing, a motor and a high voltage generator mounted on the frame in accordance with the preferred embodiment of the present invention.
Figure 20:
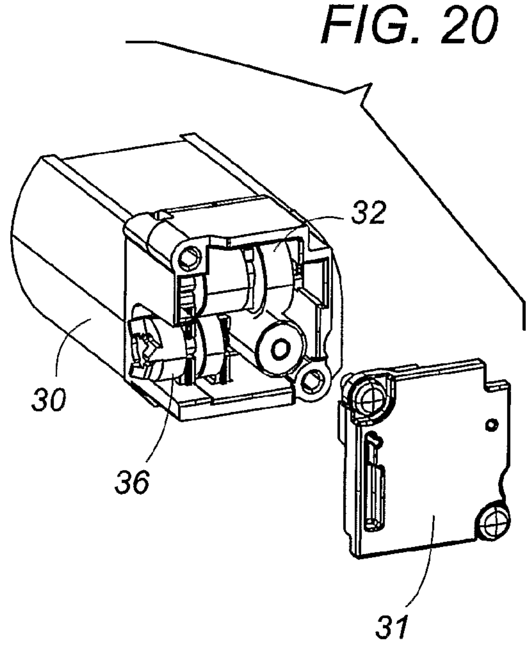
FIG. 20 is an exploded perspective view showing the motor and its associated parts accommodated within the housing in accordance with the preferred embodiment of the present invention.

As shown in FIG. 17, the housing 10 may be shaped into a generally flat disc, and thus basically composed of a center frame 100, a front shell 120, and a rear shell 140 all being molded from a dielectric plastic material and assembled together into a unitary structure to form a front compartment 130 and a rear compartment 150 on opposite faces of the frame 100, respectively behind the front and rear shells. When taking such generally flat disc shape, the front compartment 130 accommodates therein the motor 30, the battery 50, and the high voltage generator 40 which are all supported on the frame 100, while the rear compartment 150 constitutes the concavity 12 for receiving the reservoir 210. The frame 100 is formed on its front face with individual sections 103,104, and 105 respectively for mounting the motor 30, the high voltage generator 40, and the battery 50, as shown in FIGS. 18 and 19. The motor 30 is received in the section 103 together with a gearbox 31. The high voltage generator 40 is composed of a transformer 41 and various electric components mounted on a printed board 80. The transformer 41 is packed into an insulated module fitted in the section 104. In that the transformer 41 occupies much more space than the motor 30 and battery 50, the housing is designed to arrange the transformer 41, the motor 30, and the battery 50 in compact. That is, the transformer 41 is accommodated within the lower part of the front compartment, while the motor 30 and the battery 50 are accommodated within the upper part of the front compartment in side-by-side relation with each other such that the motor and the battery are arranged in stack with the transformer with respect to a vertical axis of the housing 10. The section 105 receives, in addition to the battery 50, a terminal fixture 52 having leads for electrical connection of the battery 50 to the motor 30 and the high voltage generator 40 through a power switch 60 and a control circuit formed on the printed board 80. As shown in FIG. 20, the gearbox 31 includes a reduction gear set 32 through which the motor output is transmitted to an actuator 36 provided for detachable driving connection to the joint 238 of the pump 230 on the side of the cartridge 200. Preferably, the actuator 36 is disposed immediately below a mount 110 formed at the upper end of the frame 100 and is accessible through an opening 112 in the mount 110, as shown in FIGS. 22 and 23. The mount 110 is somewhat recessed for retaining the dispensing unit 220 thereon when the cartridge 200 is attached to the housing 10. The mount 110 is cooperative with adjacent side walls 114 to define a positioning means for the cartridge. Preferably, a pair of hooks 108 is attached on the opposite sides of the frame 100 to constitute a positioning means for detachably holding the inner cover 20 on the housing 10. The hook 108 has a release button 109 which releases the inner cover 20 upon being pressed. As seen in FIGS. 1 and 5, the inner cover 20 may have a flat top 21 formed with a center window 22 through which the nozzle 240 projects when the inner cover 20 is placed over the top half of the housing 10 with the cartridge 200 attached to the housing 10. The periphery of the window 22 constitutes a retainer ring that holds the flat nozzle bottom 241 on the mount 110 at the upper end of the housing 10. As shown in FIG.17, the front shell 120 is formed with a window 122 which communicates with the section 105 for replacement of the battery 50. Thus, the battery 50 can be easily replaced by simply removing the inner cover 20 as well as a lid 124 of the window 122. The lid 124 may be eliminated from the device for simplicity.

The rear compartment 150 may be accommodated with a field electrode which surrounds the reservoir 210 to give the same electrical potential to the liquid composition within the reservoir 210 and to the liquid composition within the dispensing unit 220 for keeping the entire liquid composition free from seeing the electric current which would certainly deteriorate the liquid composition.

Figure 24:
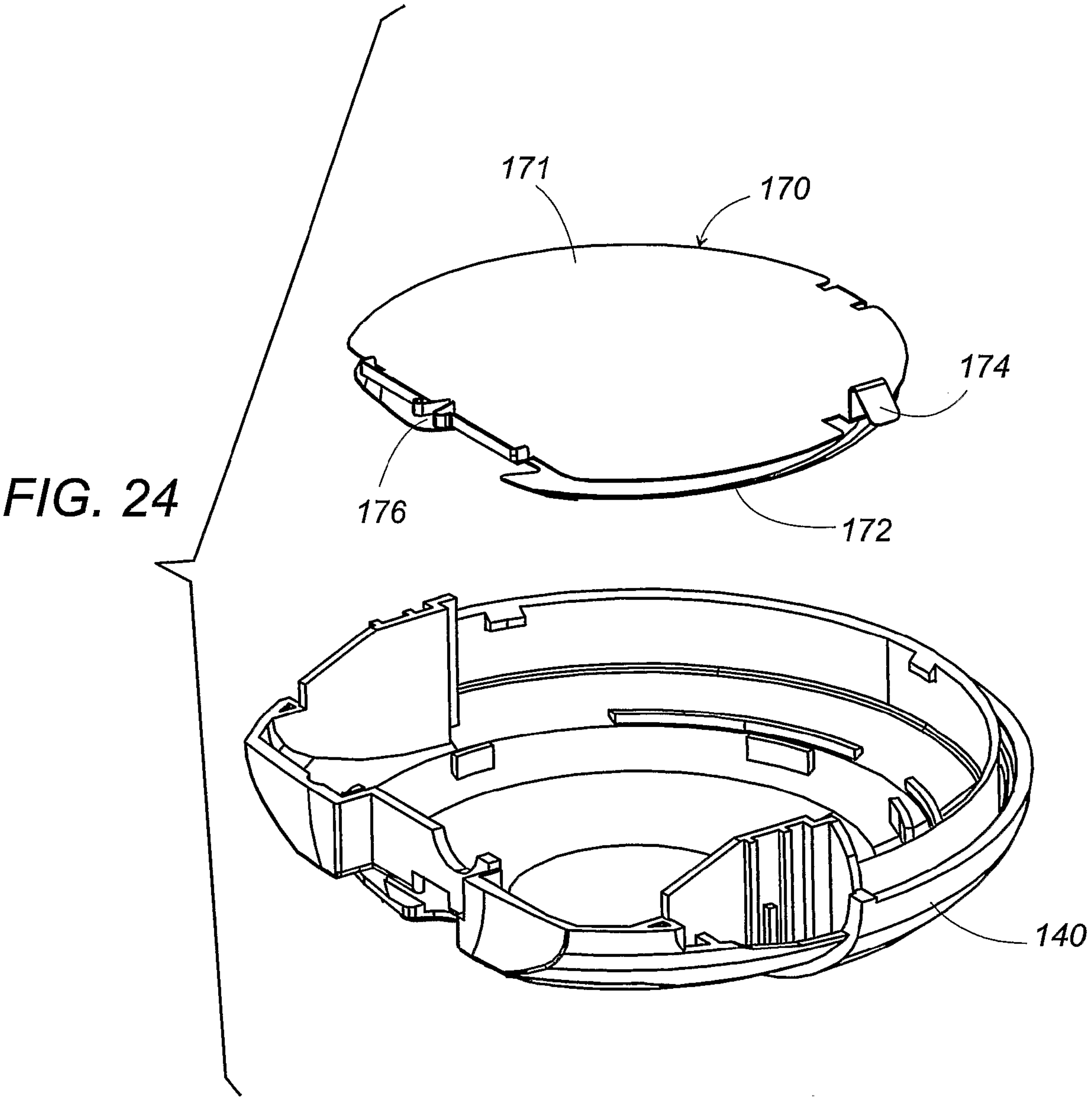
FIG. 24 is an exploded perspective view of parts forming a field electrode and associated parts of the above device.

As best shown in FIGS. 23 and 24, in one embodiment, the field electrode 170 is composed of a first plate 171 and a second plate 172 both made of an electrically conductive metal and shaped to define therebetween the concavity 12 surrounding the entire area of the reservoir 210. The plates 171 and 172 are electrically connected to each other at their peripheries, and are secured to the frame 100 and the rear shell 140. In order to receive the high voltage, the plate 171 is formed to have a lug 174 which extends through the dielectric plate 181 and the frame 100 for electrical connection with a terminal 44 of the high voltage generator 40. The plate 171 is also formed with the voltage terminal 176 in the form of a spring catch for detachable connection with the pin 254 of the dispensing unit 220, as explained hereinabove.

It is noted in this connection that the metal plate 270 and the 250 of the dispensing unit 220 are electrically connected to the field electrode 170 and therefore act as additional field electrode covering the pump. Also, the metal plate 270 is formed with a metal tube 271 which is inserted into the plug 232 to charge the liquid composition within the plug, and therefore acts also as a further field electrode. Thus, the liquid composition is electrically charged along the entire path from the reservoir 210 to the nozzle 240. Instead of using the metal tube 271, it is equally possible to provide an extension which extends from at least one of the plates 171 and 172 and projects outwardly from the concavity to cover the plug 232 and the adjacent part of the dispensing unit.

Figure 25:
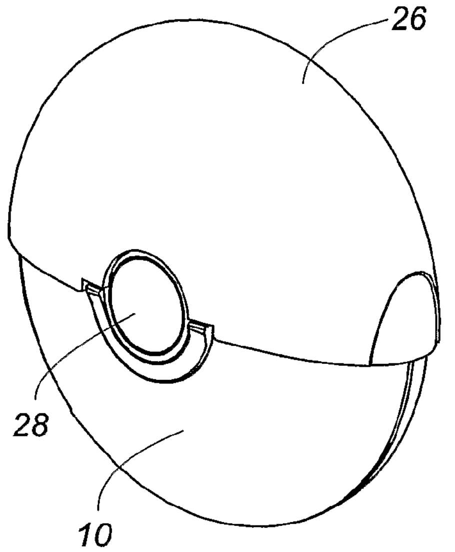
FIG. 25 is a perspective view of the above device with an outer cover attached.
Figure 26:
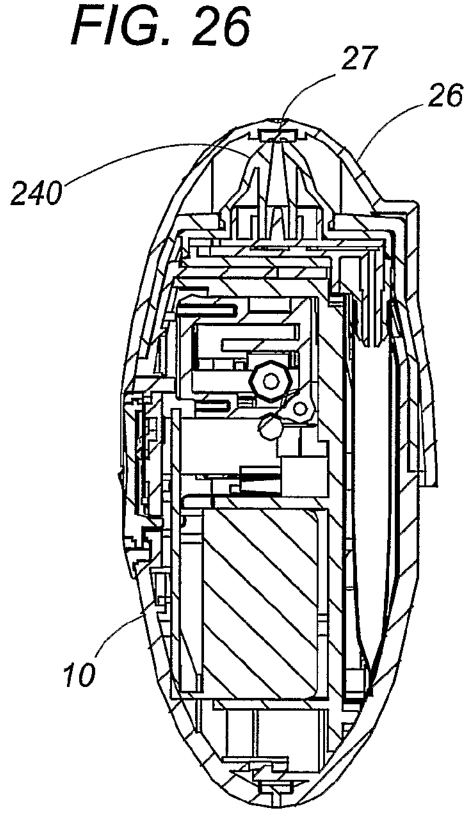
FIG. 26 is a vertical section of the above device with the outer cover attached.

In a preferred embodiment, when the outer cover 26 is fitted over the housing 10, as shown in FIGS. 25 and 26, a sealing rubber 27 at the inner upper end of the outer cover 26 comes into contact with the nozzle 240. The outer cover 26 is also formed with tabs 28 one of which conceals therebehind the power switch 60 to keep the device inoperative. Also, the outer cover 26 conceals the release buttons 109 therebehind to prevent accidental detachment of the inner cover from the housing 10.

Figure 27:
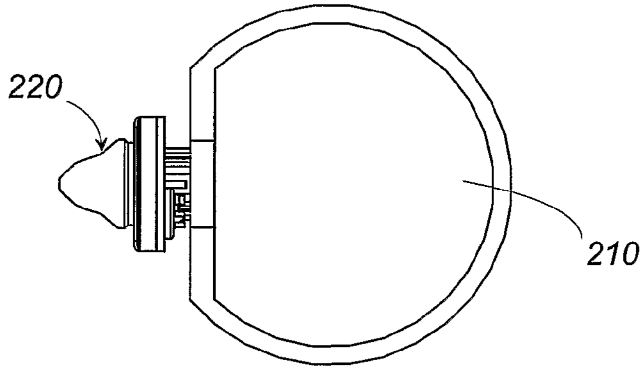
FIG. 27 is a plan view of the cartridge.
Figure 28:
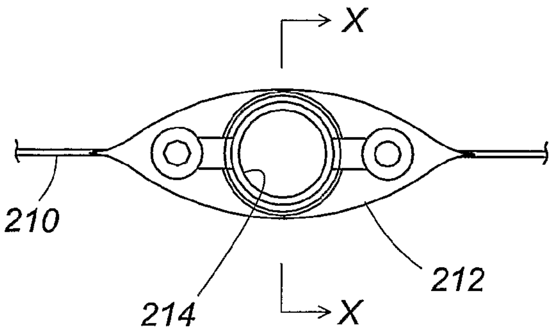
FIG. 28 is a front view of a fitment attached to a reservoir of the cartridge.
Figure 29:
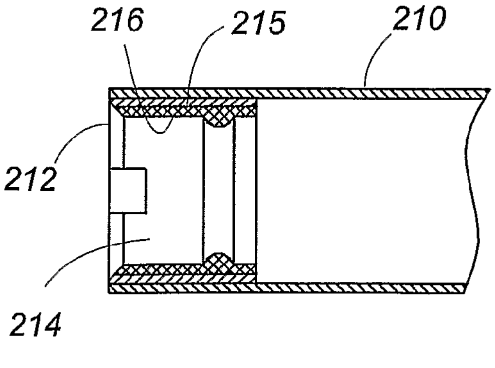
FIG. 29 is a cross section taken along line X-X of FIG. 28.

With reference to FIGS. 27 to 29, the cartridge 200 is again explained in details with respect to geometrical configuration of the reservoir 210. In one preferred embodiment, the reservoir as shown as 210, is made from a deformable plastic material into a flat bag which has a planar configuration of a segment of an approximate circle and has a mouth to which the fitment 212 is attached. The fitment 212 is molded from a plastic material to have a socket 214 for receiving the plug 232 of the dispensing unit 220. In detail, the reservoir 210 is shaped into the segment of circle defined between a chord and a circumference of an approximate circle greater than a circumference of a semicircle. The mouth or the fitment 212 is located at a center of the chord such that the distance from the mouth to any point of the circumference of the circle can be made approximately the same, providing smooth sucking up of the liquid composition from the reservoir and deforming according to the amount of liquid composition left in the reservoir, such that residue left in the end can be kept to a minimum.

In one embodiment, the plug is detachable to the fitment via, for example, a resilient material provided with the fitment. The so-called clean-click-system fitment may be employed for realizing this embodiment. This embodiment is advantageous for providing a cartridge devoid of the dispensing unit, thereby providing an even smaller cartridge.

In the illustrated embodiment of FIG. 25, the fitment 212 is molded to give a first section 215 for welding connection with the reservoir 210 and a second section 216 for welding connection with the plug 232. The first and second sections are molded from different plastic materials so as to be compatible respectively with different plastic materials forming the reservoir 210 and the plug 232, according to their specific requirements. This embodiment is advantageous for providing a secure connection between the dispensing unit and the reservoir.

Other embodiments are possible for providing a secure connection between the dispensing unit and the reservoir. The plug may be molded to give a section for welding connection with the fitment, the section being compatible with the fitment. Alternatively, the fitment and plug may be integrally molded to give a section for welding connection with the reservoir, the section being compatible with the reservoir.

Figure 30:
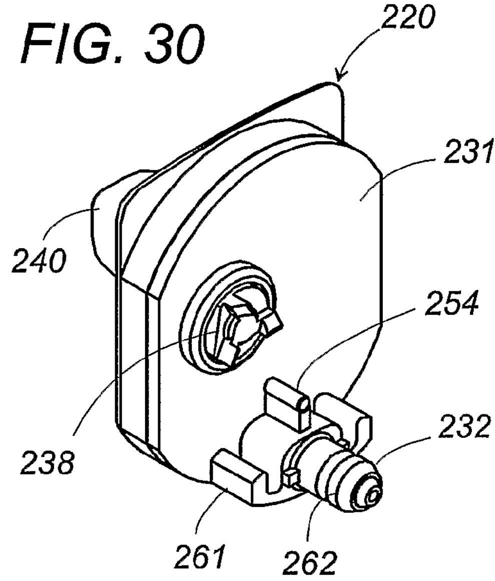
FIG. 30 is a perspective view of a dispensing unit utilized in the above device in accordance with a preferred embodiment of the present invention.
Figure 33:
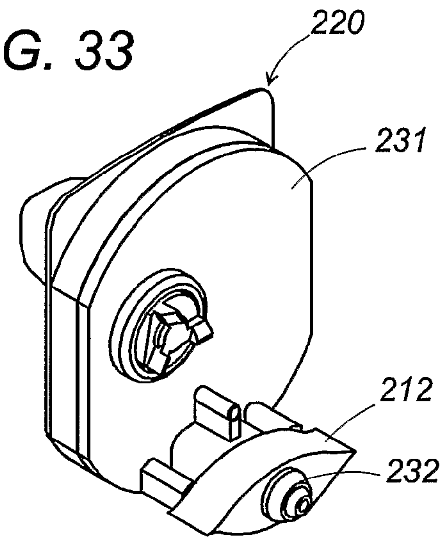
FIG. 33 is a perspective view of a dispensing unit utilized in the above device in accordance with another preferred embodiment of the present invention.
Figure 31:
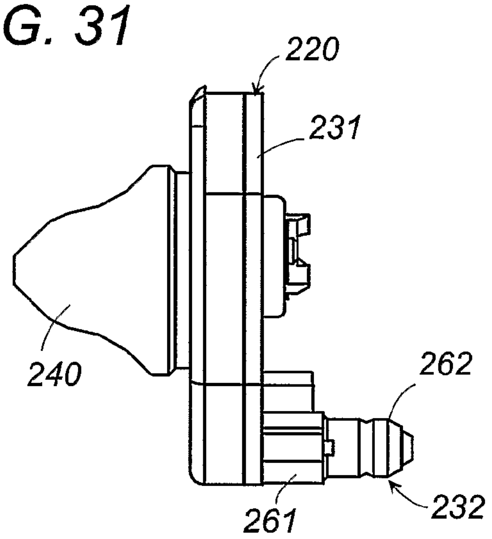
FIG. 31 is a side view of the dispensing unit of FIG. 30.
Figure 34:
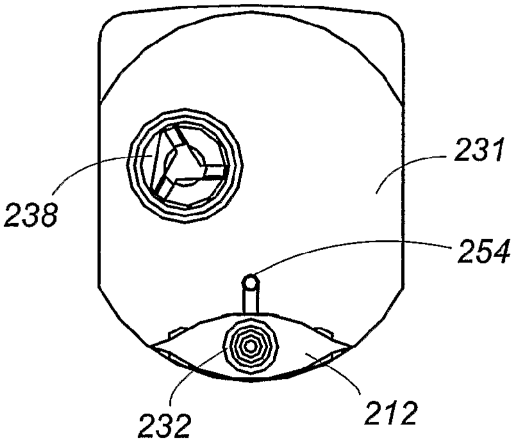
FIG. 34 is a rear view of the dispensing unit of FIG. 33.
Figure 32:
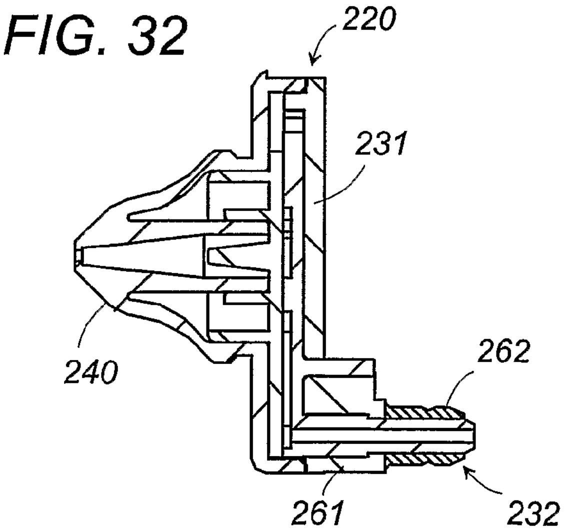
FIG. 32 is sectional view of the dispensing unit of FIG. 30.
Figure 35:
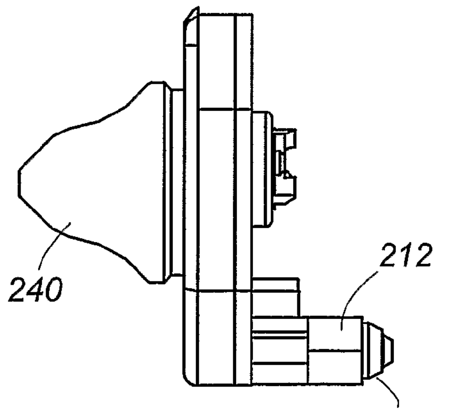
FIG. 35 is a side view of the dispensing unit of FIG. 33.

Referring to FIGS. 30 to 32, there is shown the dispensing unit 220 having the plug 232 detachable to the fitment 212 according to one embodiment of the present invention. The plug 232 is molded integrally with the base 231 to have a first section 261 and a second section 262. The first section 261 is molded from a plastic material forming the base 231, while the second section 262 is molded from a plastic material different from that of the base but compatible with the plastic material forming the fitment 212. Thus, the second section 262 fits easily into the fitment 212 and welded thereto such as by the known ultrasonic welding for secured sealing connection to the reservoir.

FIGS. 32 to 35 show another dispensing unit 220 having the plug 232 which is integrally molded with the fitment 212. The fitment 212 is inseparably fixed to the plug 232 and is molded from a plastic material compatible with the reservoir for enhanced welding connection of the fitment 212 to the reservoir.

Figure 36:
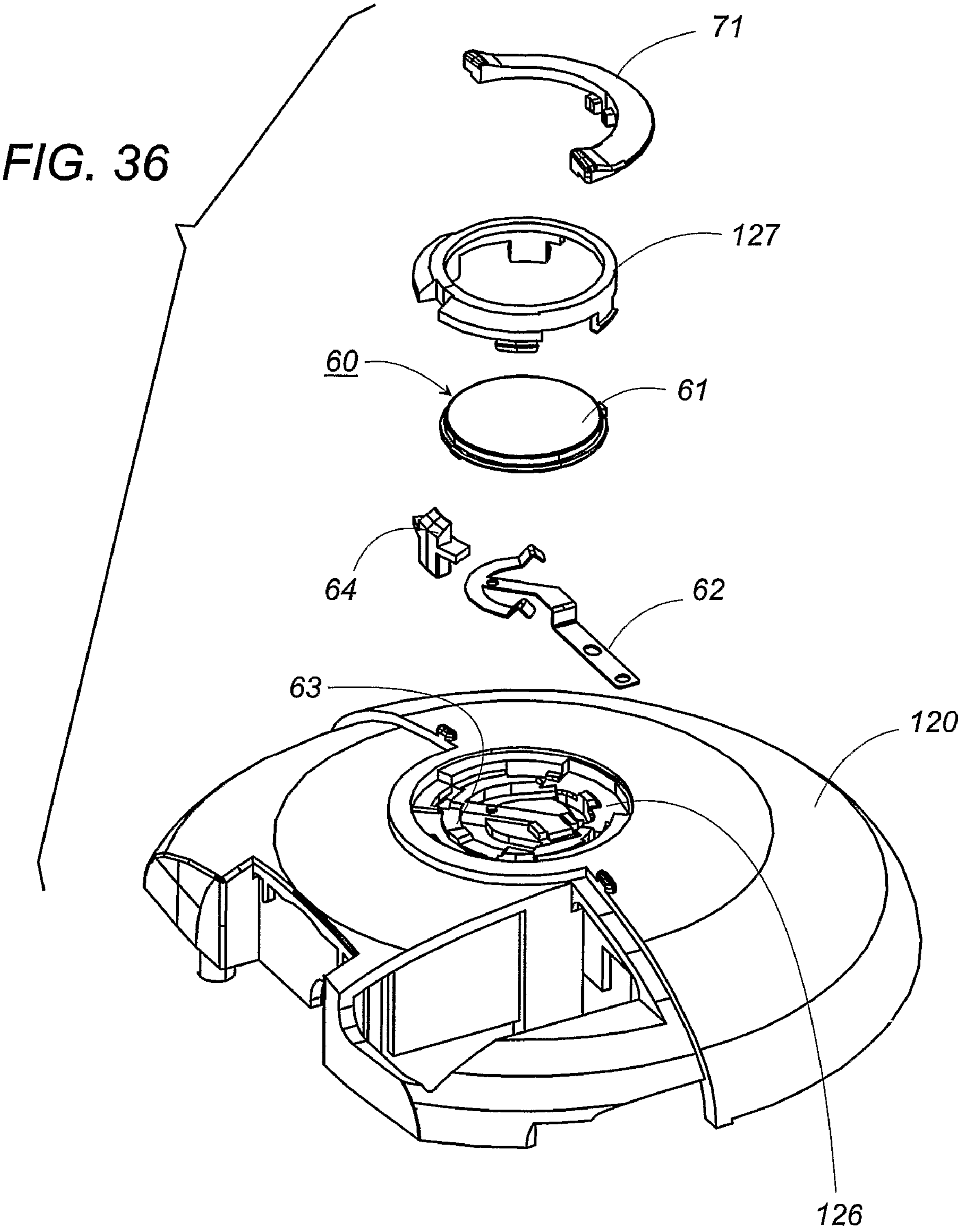
FIG. 36 is an exploded perspective view illustrating a switch, a selector, and associated parts of the device in accordance with a preferred embodiment of the present invention.
Figure 37A:
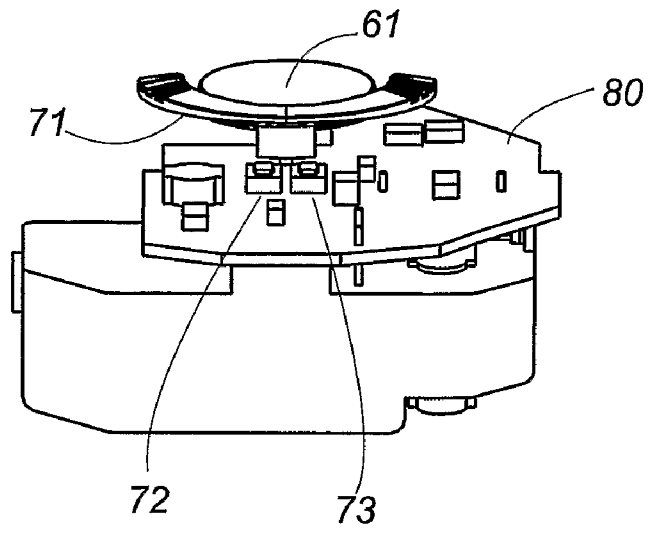
FIGS. 37A to 37C illustrate different positions of the selector, respectively.
Figure 37B:
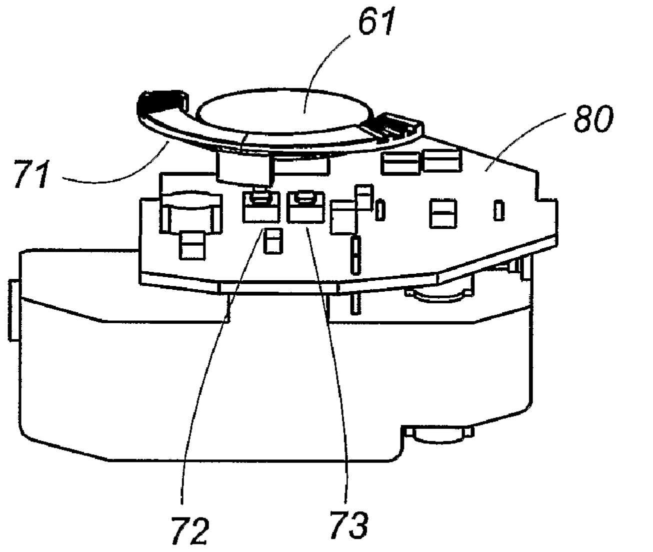
Figure 37C:
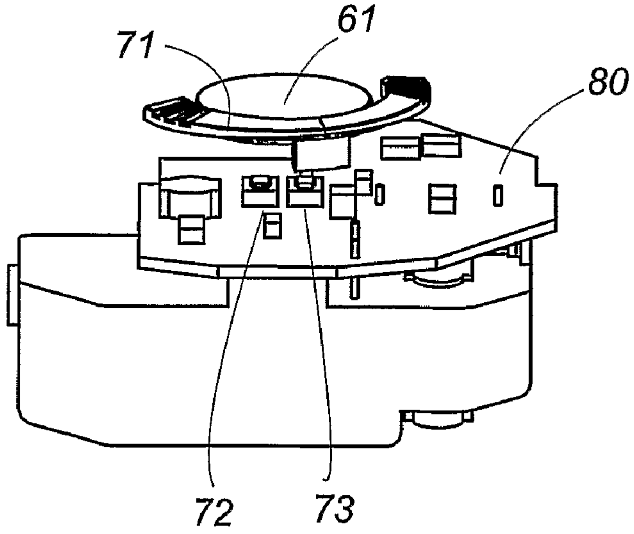

Referring to FIG. 36, the power switch 60 preferably includes a switch knob 61 and a switch contact 62 disposed within a center cavity 126. The switch knob 61 is held within the cavity 126 by means of a retainer ring 127 to be capable of being depressed against a spring bias, and energizes the motor 30 and the high voltage generator 40 upon being depressed. A light-emitting-diode (LED) 63 disposed in the cavity 126 is energized in response to the knob 61 being depressed to issue a light through a transparent cover 64 for indication of the operation. In a preferred embodiment, the device also includes a selector 70 for selecting one of three modes, i.e., a lock mode for disabling the operation, a spraying mode for enabling the liquid composition to be electrostatically sprayed, and a dripping mode for enabling the liquid composition to be dispensed out of the nozzle without being electrostatically charged. The selector 70 includes a handle 71 which is rotatable around the ring 127 for selecting one of three positions, i.e., a lock position, a spraying position, and a dripping position, as shown in FIGS. 37A to 37C, respectively defining the above lock mode, the spraying mode, and the dripping mode. In the lock position of FIG. 37A, the handle 71 has its portion engaged with the switch knob 61 to prohibit it from being pressed, thereby disabling the operating of the pump as well as the high voltage generator. The selector 70 also includes tact switches 72 and 73 which are arranged on the printed board 80 to be actuated selectively depending upon the position of the handle 71. In the spraying mode of FIG. 37B, the tact switch 72 is activated such that the pump 230 and the high voltage generator 40 are simultaneously activated upon the switch knob 61 being pressed. In the dripping mode of FIG. 37C, the tact switch 73 is activated such that only the pump 230 is activated upon the switch knob 61 being pressed. Although not clearly seen in the figures, the device may further include an indicator showing which one of the dripping and spraying modes is selected for easy confirmation by the user. Such indicator is preferred to be disposed around the selector handle 71.

Figure 38:
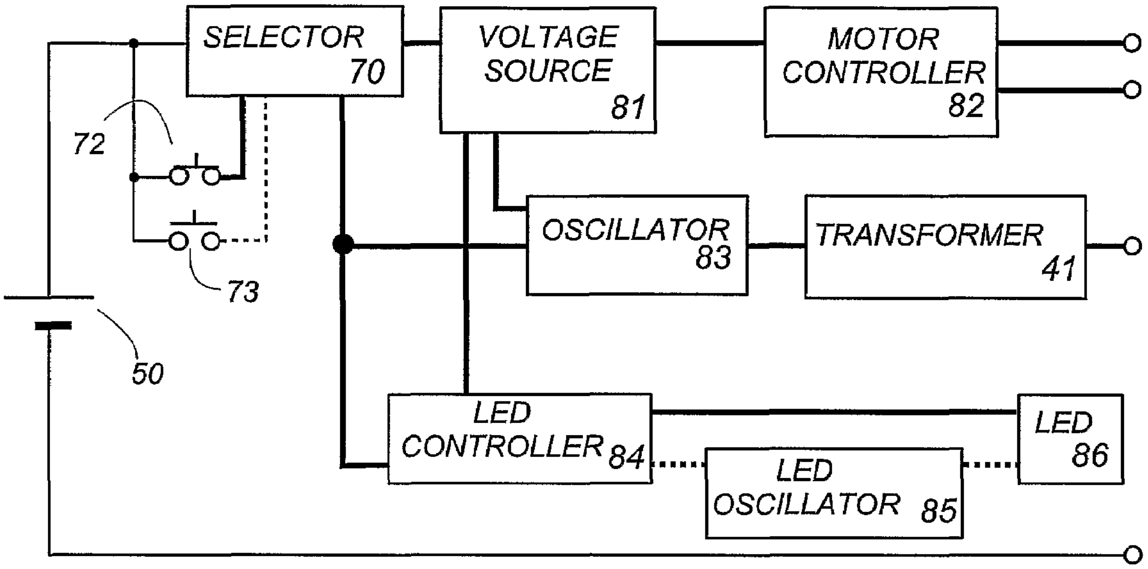
FIGS. 38 and 39 are block diagrams respectively illustrating the operation of a spraying mode and a dripping mode given to the device.
Figure 39:
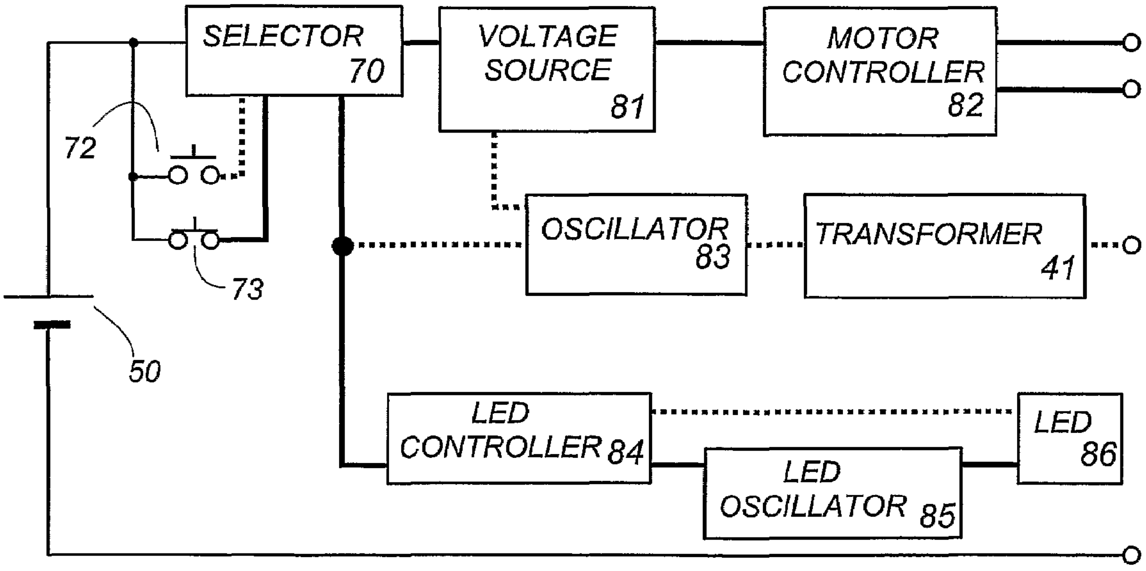

The above operation will be explained also with reference to FIGS. 38 and 39. When the tact switch 72 is turned on by the selector handle 71, the pressing of the knob 61 energizes a voltage source 81, a motor controller 82 and at the same time an oscillator 83 for the transformer 41, thereby activating the motor 30 to operate the pump 230, while applying the high voltage to charge the liquid composition. When, on the other hand, the tact switch 73 is turned on by the selector handle 71, the pressing of the knob 61 energizes the voltage source 81 and the motor controller 82 only for operating the pump without applying the high voltage to the liquid composition. Thus, the user can easily drip the liquid composition by simply manipulating the selector prior to initiating the electrostatic spraying, assuring enhanced convenience of handling the device. The voltage source 81, the motor controller 82, and the oscillator 83 are formed on the printed board 80. Further, the device includes an indicator for indicating which one of the spraying mode and dripping mode is activated. The indicator includes an LED controller 84, an LED oscillator 85, and a LED 86. When the spraying mode is selected at the selector 70, the LED controller 84 acts to turn on the LED 86, as shown in FIG. 38, in response to the knob 61 being pressed. When, on the other hand, the dripping mode is selected at the selector 70, the LED controller 84 drives the LED oscillator 85 to turn on and off the LED 86 intermittently, as shown in FIG. 39, in response to the knob 61 being pressed, thereby providing different visual confirmation to the user for easy distinction between the spraying mode and the dripping mode.

Figure 40C:
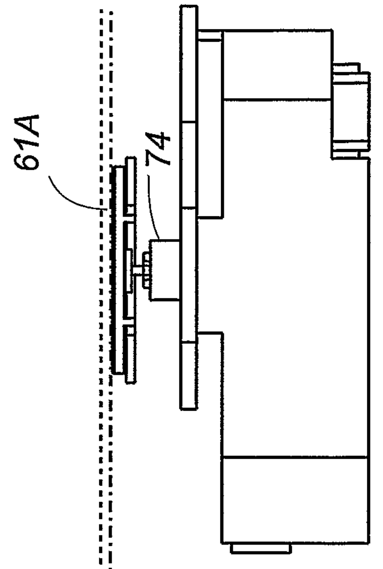
FIGS. 40A to 40C illustrate different positions of a switch for making an analogous function of the selector in accordance with another preferred embodiment of the present invention.
Figure 40B:
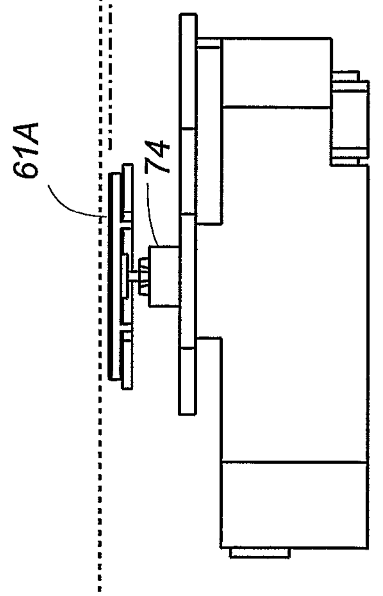
Figure 40A:
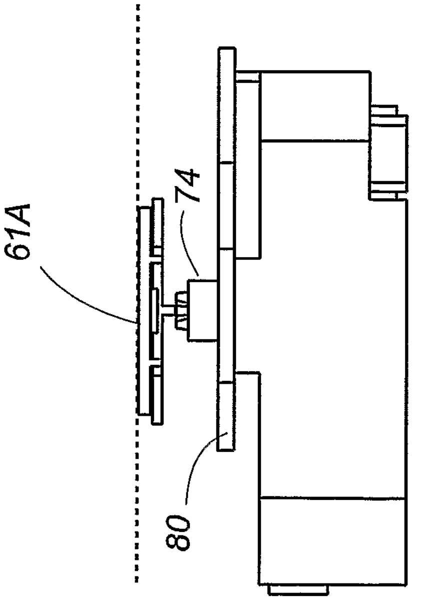

FIGS. 40A to 40C illustrate another scheme of selecting the dripping mode and the spraying mode. In this modification, a tact switch 74 of press-responsive type is cooperative with the switch knob 61A to constitute the power switch added with the function of the selector. That is, the tact switch 74 gives three positions, i.e., an off position of FIG. 40A, a spray mode position of FIG. 40B, and a drip mode position of FIG. 40C. In the off position, the switch 74 is not actuated to disable the operation of the pump as well as the high voltage generator. When the knob 61A is pressed to a small extent to correspondingly depress the switch 74, the spraying mode is selected to energize the pump 230 as well as the high voltage generator 40 for making the electrostatic spraying of the liquid composition. Upon the knob 61A being pressed to a further extent, the switch 74 is correspondingly depressed to select the dripping mode to activate only the pump 230 for dispensing the liquid composition without the electric charge. Thus, the user can easily select the mode by simply varying the pressure applied to the switch knob 61A. Alternatively, the dripping mode and the spraying mode may be assigned respectively to the depression of the small extent and to that of the further extent.

Figure 41:
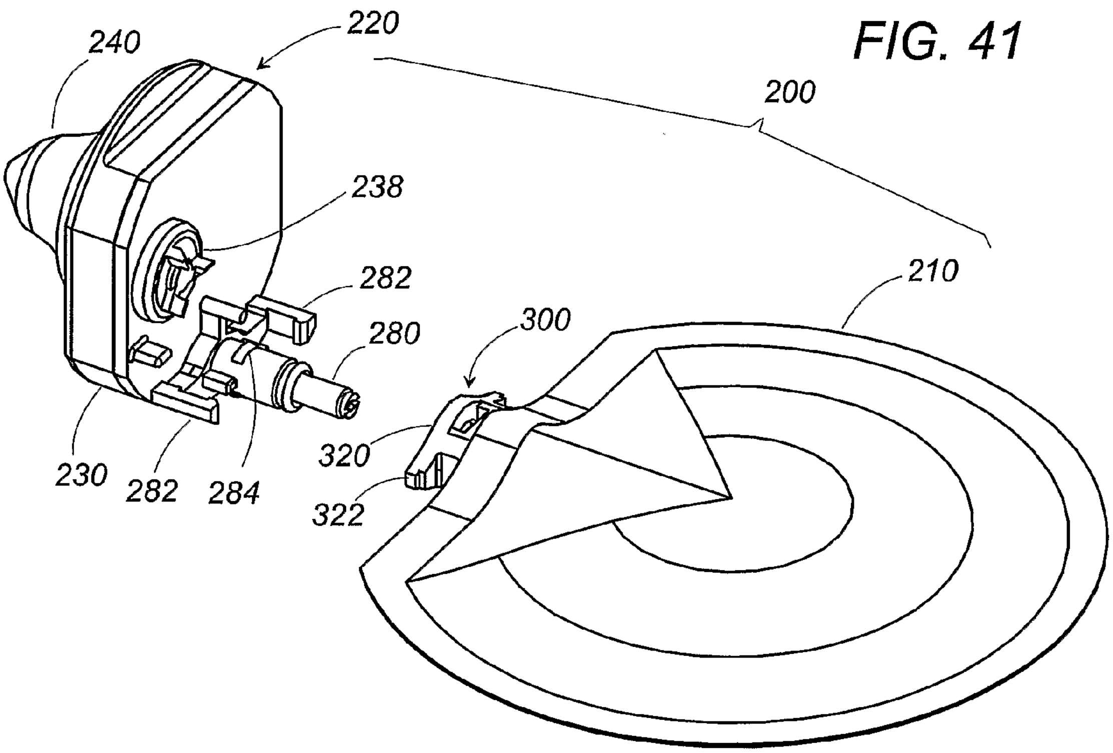
FIG. 41 is an exploded perspective view of a cartridge in accordance with another preferred embodiment of the present invention.
Figure 42:
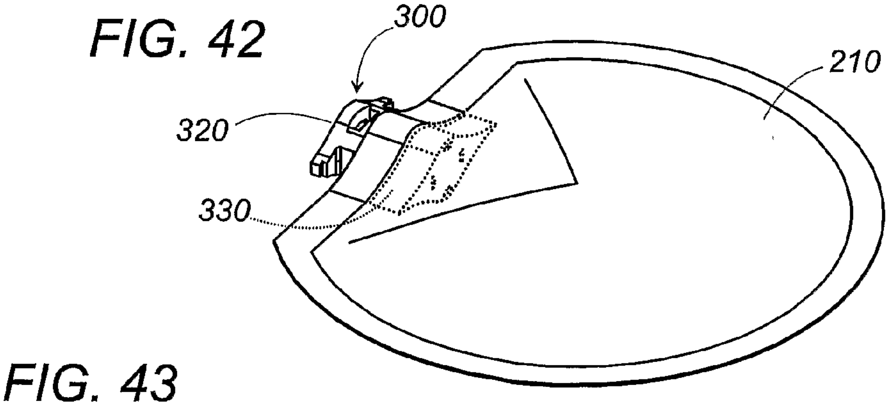
FIG. 42 a perspective view of a reservoir forming the above cartridge.

FIG. 41 illustrates a cartridge in accordance with another preferred embodiment of the present invention which is equally utilized in the above electric spraying device. Like parts are designated by like reference numerals, and therefore no duplicate explanation is deemed necessary. The cartridge 200 is composed of a dispensing unit 220 and a reservoir 210 which are basically identical to those disclosed in the above embodiment except that the reservoir 210 is provided with a specifically configured fitment 300 and that the dispensing unit 220 has specific structures for latching engagement with the fitment 300. The fitment 300 is additionally formed with a valve 330 which is configured to be opened for allowing the supply of the liquid composition from within the reservoir 210 to the dispensing unit 220 only when the reservoir 210 is fully secured to the dispensing unit 220. Otherwise, the valve 330 is kept closed to seal the reservoir 210.

Figure 49:
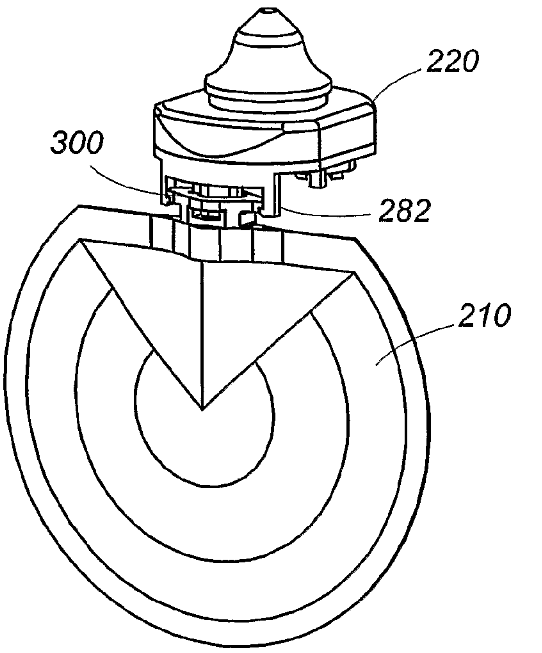
FIG. 49 is a perspective view of the cartridge shown with the plug inserted into the fitment to a short extent to hold the fitment into an interim position of closing the check valve.
Figure 50:
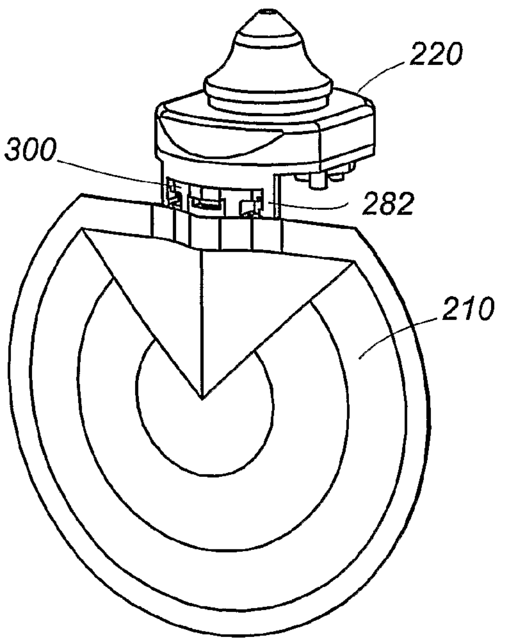
FIG. 50 is a perspective view of the cartridge shown with the plug inserted into the fitment to a full extent to hold the fitment into a ready-to-use position.
Figure 51A:
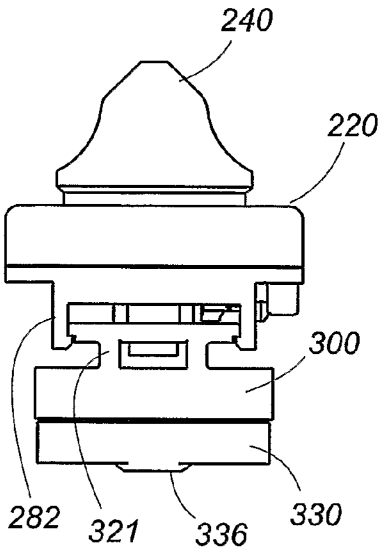
FIGS. 51A to 51C are respectively front, side, and sectional views of the dispensing unit shown with its plug inserted into the fitment to hold the fitment in the interim position.
Figure 51B:
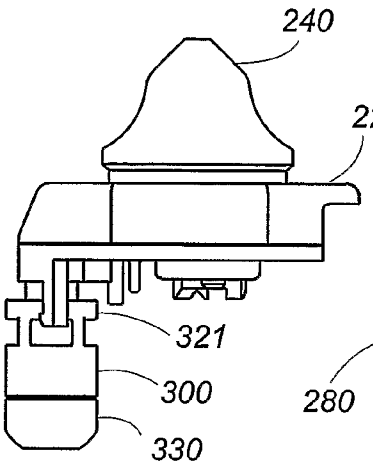
Figure 51C:
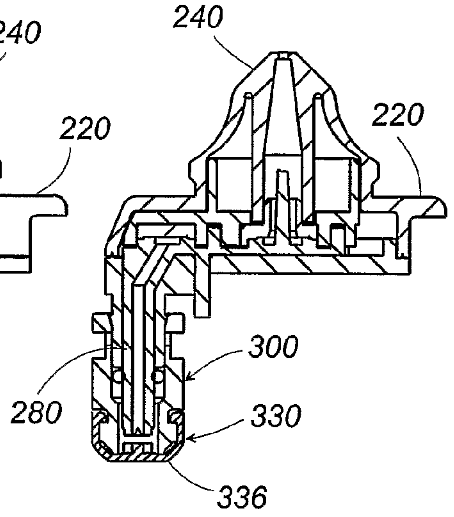
Figure 52A:
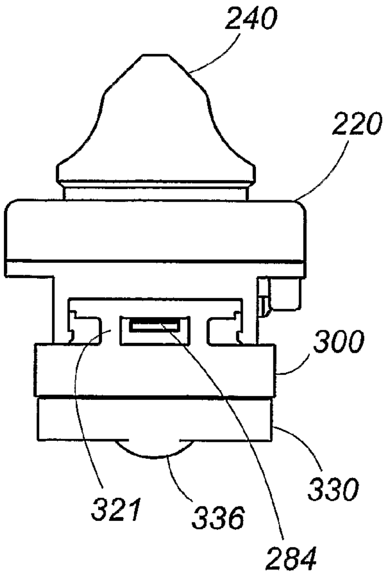
FIGS. 52A to 52C are respectively front, side, and sectional views of the dispensing unit shown with its plug inserted into the fitment to hold the fitment in the ready-to-use position.
Figure 52B:
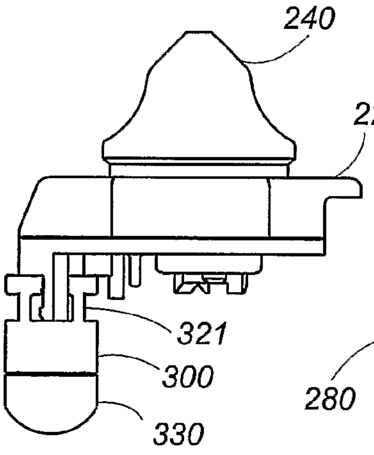
Figure 52C:
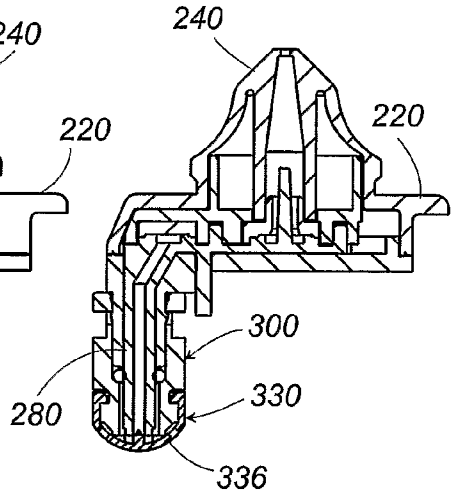

The fitment 300 is designed to detachably receive a plug 280 of the dispensing unit 220 and to take one of two positions depending upon an insertion depth of the plug 280 into the fitment 300. One is an interim position where the plug 280 is inserted to a short depth, as shown in FIGS. 49, 51, and 53, and the other is a ready-to-use position where the plug 280 is inserted to a full extent, as shown in FIGS. 50, 52, and 54. As will be discussed in detail, the valve 330 is opened only at the ready-to-use position.

The fitment 300 includes a jacket 302 shaped to be fitted into the mouth of the reservoir 210 and a cylindrical barrel 304 extending through the jacket 302. A bore 306 extends through the barrel 304 for detachably receiving the plug 280. Formed around the bottom opening of the bore 306 is a circular rim 312 in the form of a flat fringe, and a recessed bevel 314 of which upper end merges into a ring 316 on the barrel 304. The ring 316 is spaced from the bottom of the jacket 302 to leave therebetween an annular groove 313 for securing the valve 320 to the fitment 300. The plug 280 is provided with an O-ring 285 for sealing contact with the barrel 304 of the fitment 300.

Figure 53C:
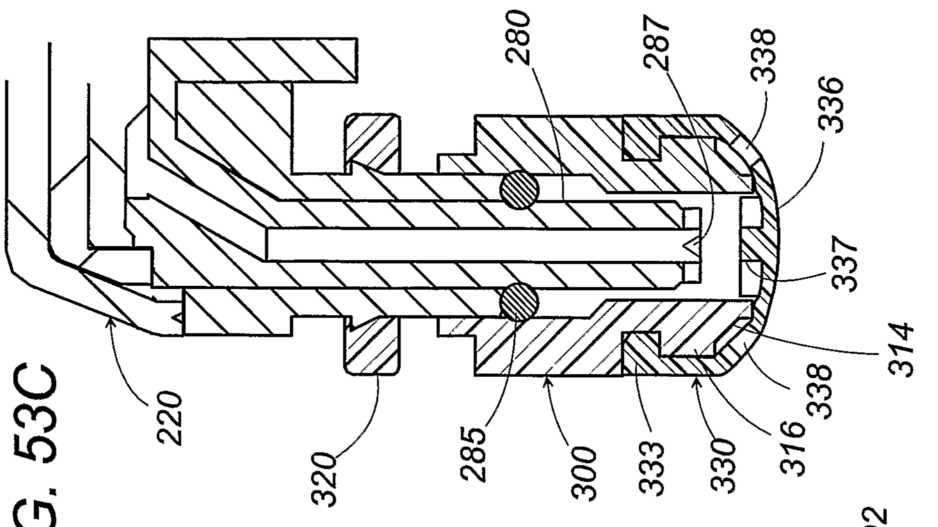
FIGS. 53A to 53C are respectively partial perspective and sectional views illustrating how the check valve is kept closed while the fitment is in the interim position.
Figure 53B:
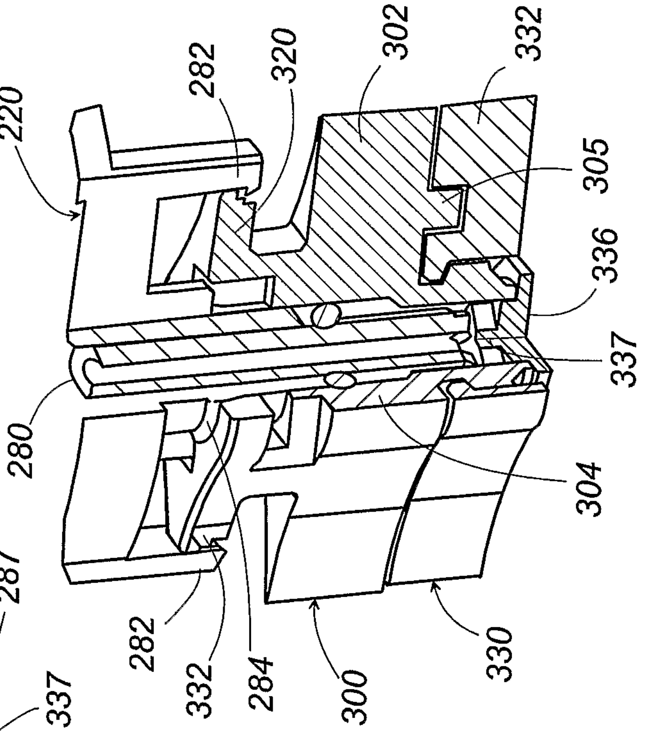
Figure 53A:
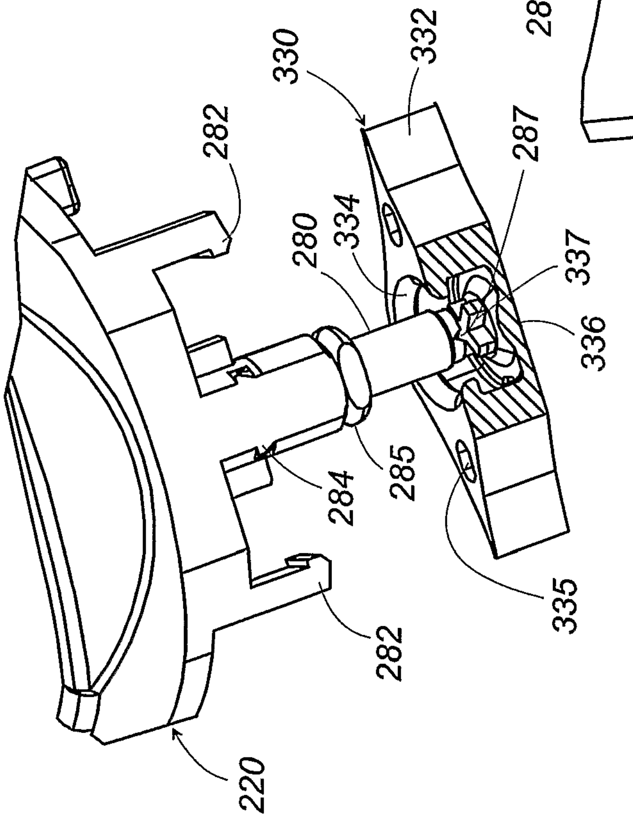
Figure 54C:
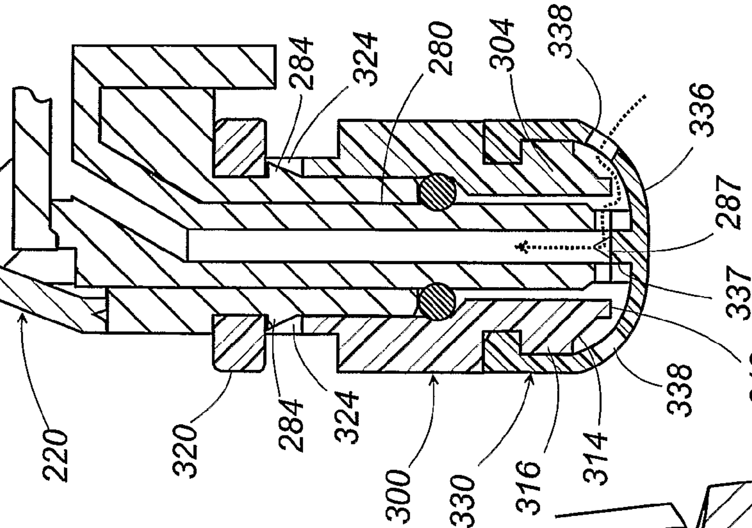
FIGS. 54A to 54C are respectively partial perspective and sectional views illustrating how the check valve is kept opened while the fitment is in the ready-to-use position.

The valve 330 is molded from a rubber material and includes a jacket 332 which is analogous in shape to the jacket 302 of the fitment 300 and is formed in its center with a socket 334 for receiving therein the barrel 304 projecting on the bottom of the fitment 300, as shown in FIGS. 45, 53C and 54C. The socket 334 is surrounded by and closed at its bottom with a thin wall structure which defines an elastic valve membrane 336 capable of being deformed to be responsible for a valve function. The membrane 336 is formed in its circular bottom with four vents 338 which are evenly spaced circumferentially around the bottom of the socket 334 in correspondence with the recessed bevel 314 of the barrel 304. The recessed bevel 314 is provided to leave a steep edge around the ring 316 such that the valve membrane 336 is given an origin of elastic deformation at that edge for limiting the zone of the elastic deformation to a portion only below the ring 316. This is advantageous for opening and closing the valve membrane 336 at a short stroke, and therefore giving a sufficient sealing pressure to the membrane 336.

Formed on the inner bottom of the membrane 336 is a cross-shaped projection 337 which comes into abutment against the lower end of the plug 280 when the plug 280 is fully inserted into the socket 334. As shown in FIGS. 46 and 47, the vents 338 are staggered with respect to the individual arms of the cross-shaped projection 337 for establishing a feed passage leading from the vents 338 to inside of the plug 280 through the bottom open end of the barrel 304, which will be explained later.

The socket 334 is formed at its upper end with an inwardly projecting lip 333 which is press-fitted into the groove 313 around the barrel 304 of the fitment 300 for securing the valve 330 to the fitment 300. At this time, a pair of studs 305 projecting on the bottom of the fitment 300 fit snugly into a corresponding pair of holes 335 in the upper end of the valve 330 for exact alignment of the valve 330 to the fitment 300. Thus, the valve 330 is easy to be secured to the fitment 300 by making the use of the resiliency given to the whole structure of the valve 330. In this respect, the valve is preferred to be made from the rubber material, although it is not limited thereto.

Figure 43:
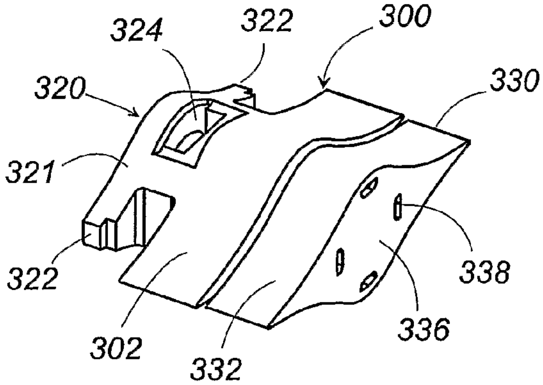
FIG. 43 is a perspective view of a fitment secured to the reservoir for connection with a dispensing unit of the cartridge.
Figure 44:
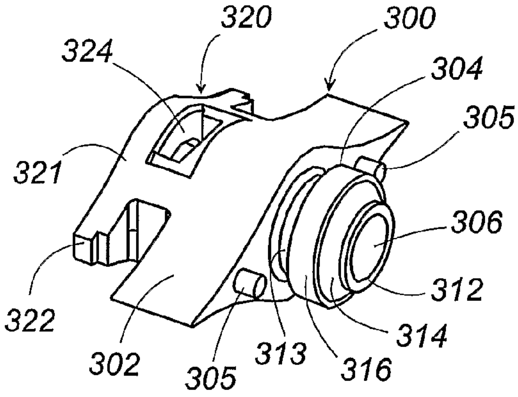
FIG. 44 is a perspective view of the fitment shown with a check valve taken away.
Figure 48:
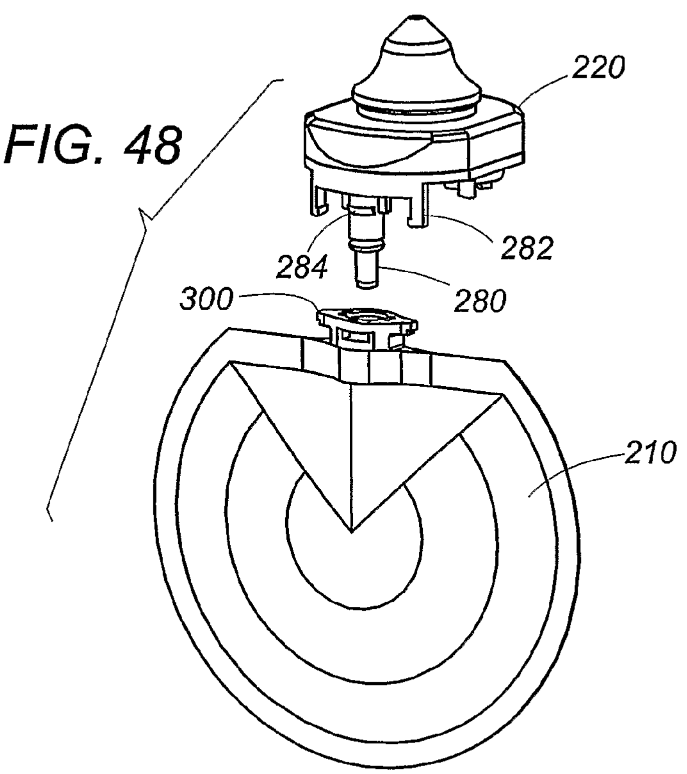
FIG. 48 is an exploded perspective view of the cartridge.

Turning back to FIGS. 43 and 44, the fitment 300 is also formed on its upper end with a coupler 320 for detachable engagement with the dispensing unit 220. The coupler 320 includes catch projections 322 formed at opposite ends of a yoke 321 upstanding from the jacket 302, and includes catch recesses 324 formed in a portion of the barrel 304 projecting on the upper end of the jacket 302. The catch projections 332 come into latching engagement respectively with hooks 282 depending from the dispensing unit 220, when the plug 280 is inserted by the short extent, as shown in FIGS. 49, 51, and 53, whereby the fitment 300 or the reservoir 210 is held in the interim position. When the plug 280 is inserted further to the full extent, as shown in FIGS. 50, 52, and 54, detents 284 formed on the plug 280 come into latching engagement respectively with catch recesses 324 to retain the fitment 300 in the ready-to-use position.

In the interim position, as shown in FIGS. 51 and 53, particularly FIG. 53C, the valve membrane 336 is held in its original condition where it is urged for pressed sealing contact with the rim 312 as being kept intact from the lower end of the plug 280, thereby closing the lower open end of the barrel 304 and therefore disabling the supply of the liquid composition from within the reservoir 210 through the plug 280 to the dispensing unit 220.

Figure 54B:
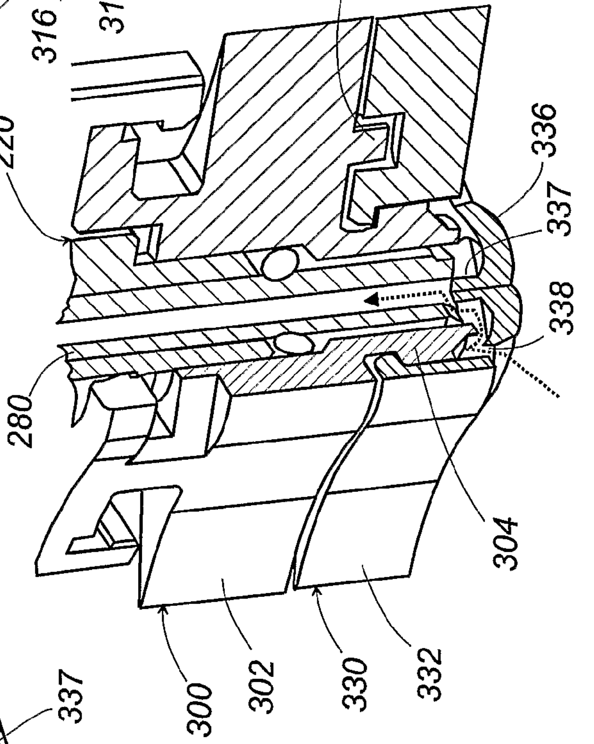
Figure 54A:
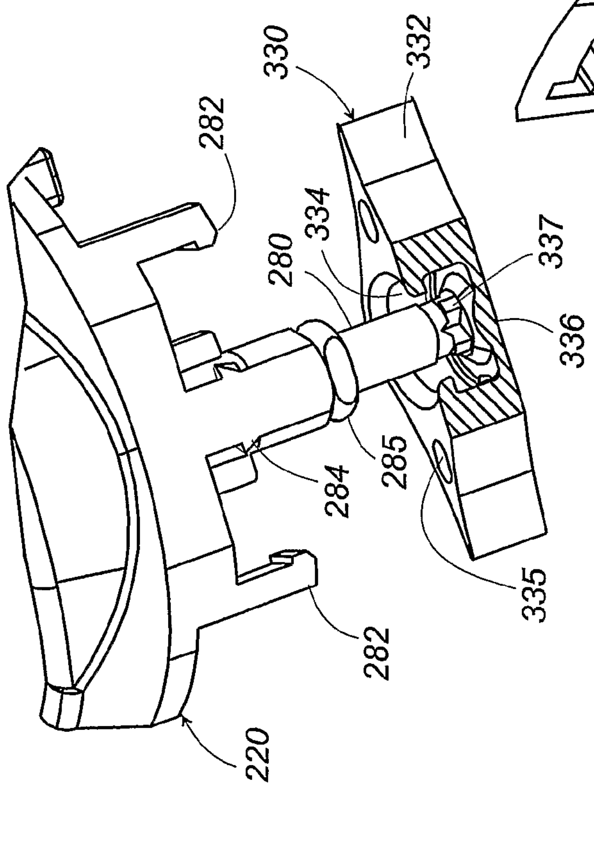

When the fitment 300 is held in the ready-to-use position, as best shown in FIGS. 52 and 54, particularly FIG. 54C, the plug 280 abuts against the cross-shaped projection 337 to elastically deform the membrane 336 to such an extent as to leave a clearance between the membrane 336 and the rim 312, thereby communicating the lower open end of the barrel 304 with the vents 338 through the clearance to establish the feed passage leading from the vents 338 through the clearance and the lower open end of the barrel 304 into the plug 280. Thus, the liquid composition is allowed to advance through the feed passage to the dispensing unit 220, as indicated by dotted lines in FIGS. 54B and 54C, so as to be electrostatically sprayed therefrom. Since the vents 338 are formed in opposed relation to the recessed bevel 314, the vents 338 can be brought into an open communication with the lower end of the barrel 304 as soon as the membrane 336 is deformed to leave the rim 312. It is noted in this connection that the plug 280 is formed at its lower end with slits 287 which are diametrically opposed and staggered with respect to the individual arms of the cross-shaped projection 337 in order to take the liquid composition into the plug 280 through the slits 287 without being interfered with the projection 337. Since the slits 287 are staggered with respect to the arms of the cross-shaped projections 337, the feed passage can be made smooth for feeding the liquid composition successfully through the valve membrane to the plug 280 of the dispensing unit 220.

With the use of the fitment 300 with the valve 330, the reservoir 210 can be sealed to keep the liquid composition free from being exposed to the atmosphere, prior to starting the liquid spray, thereby protecting the liquid composition from deterioration or leakage in a non-use condition. The sealing the liquid composition is desirous for reasons of that the composition may be solidified upon exposure to the atmosphere to clog the pump and that the composition may absorb water in the air to lose an optimum phase, detracting from an optimum spraying effect. Thus, the reservoir 210 with the fitment 300 can be presented as a replacement package sealing the composition.

Further, since the fitment 300 can be retained by the dispensing unit 220 at its interim position where the valve 330 is kept closed, the liquid composition can be still prevented from the deterioration or leakage even when reservoir 210 is retained to the dispensing unit 220. This is particularly advantageous in that the reservoir or replacement reservoir can be presented in the form of being integrated with the dispensing unit 220 so that the user is simply required to push the fitment 300 into the read-to-use position when using the fresh reservoir. In addition, when the user refrains from using the device for a relatively long period, the user can move the fitment back into the interim position for protecting the liquid composition during the non-use period. Further, when the reservoir 210 is provided as being coupled to the dispensing unit 220, the plug 280 can be kept free from being contaminated with unwanted bacteria which would otherwise deteriorate the composition.

All documents cited in the detailed description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An electrostatic device configured and disposed to electrostatically charge and dispense a liquid composition from a supply to a point of dispense, wherein the device comprises:

- an actuator;
- a high voltage generator to provide a high voltage;
- a power source to activate said actuator and said high voltage generator;
- a reservoir to contain the supply of said liquid composition; and
- a dispensing unit comprising:
  - a suction pump in immediate downstream relation with the reservoir for supplying the liquid composition from the reservoir, said pump being mechanically connected to said actuator to be driven thereby;
  - an emitter electrode to electrostatically charge the liquid composition, the emitter electrode being electrically connected to said high voltage generator; and
  - a nozzle to dispense the liquid composition, said nozzle being disposed at the point of dispense; and wherein the reservoir is configured to provide a removable cartridge, said reservoir being deformable according to inner pressure, wherein said reservoir is coupled to said dispensing unit and is cooperative therewith to define said removable cartridge, wherein said dispensing unit comprises a plug to be inserted into a fitment, wherein said reservoir comprises a mouth for connecting with said fitment, and wherein said reservoir and dispensing unit is in fluid communication by attaching said plug with said fitment, and said fitment with said mouth, wherein said fitment is provided with a valve and is cooperative therewith to establish a feed passage from said reservoir to said plug for feeding said liquid composition from within said reservoir to said dispensing unit, said valve configured to open and close said feed passage for regulating a supply of said liquid composition, said fitment has a barrel for detachably receiving therein said plug, said barrel having an open end at which said plug communicates with sad feed passage and which is surrounded by a rim, said valve having an elastically deformable valve membrane which is normally pressed held against said rim to seal said open end said valve membrane having a plurality of vents which are formed in a portion corresponding outwardly of said rim so as to be normally isolated from said plug by said rim, said valve membrane being elastically deformed, in response to being pressed by said plug, to give a clearance between the valve membrane and the rim, thereby opening said feed passage for allowing the supply of the liquid composition from within the reservoir to the plug through the vents and the clearance, said barrel is formed with a recessed bevel which is located at a portion outwardly of said rim and is covered by said valve membrane, said vents being formed in correspondence with said recessed bevel, said valve membrane is formed with four said vents which are evenly spaced circumferentially, said valve membrane being formed on its interior with a cross-shaped projection which is pressed by said plug to deform said valve membrane for opening said feed passage in said ready-to-use position, said cross-shaped protection having individual arms which are staggered with respect to said vents.

2. The device as at forth in claim 1, wherein said plug is formed at its lower end with slits which are staggered with respect to the individual arms at said cross-taped projection and are aligned with said vents.

* * * * *